United States Patent
Lu et al.

(10) Patent No.: US 7,899,889 B2
(45) Date of Patent: Mar. 1, 2011

(54) METHOD AND APPARATUS FOR DETERMINING A SUBNET MASK BASED ON PRESENCE OR ABSENCE OF RESPONSES TO PLURAL COMMUNICATION PACKETS ISSUED DURING A SEARCH ITERATION

(75) Inventors: Gang Lu, Belmont, MA (US); James O'Toole, Cambridge, MA (US); M. Frans Kaashoek, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 62 days.

(21) Appl. No.: 11/879,687

(22) Filed: Jul. 18, 2007

(65) Prior Publication Data

US 2007/0266125 A1 Nov. 15, 2007

Related U.S. Application Data

(60) Division of application No. 09/535,279, filed on Mar. 24, 2000, now Pat. No. 7,281,036, which is a continuation-in-part of application No. 09/294,836, filed on Apr. 19, 1999, now Pat. No. 6,345,294.

(60) Provisional application No. 60/160,535, filed on Oct. 20, 1999, provisional application No. 60/178,063, filed on Jan. 24, 2000.

(51) Int. Cl.
*G06F 13/00* (2006.01)

(52) U.S. Cl. ...................................................... 709/220

(58) Field of Classification Search .................. 709/220
See application file for complete search history.

(56) References Cited

U.S. PATENT DOCUMENTS

| | | | |
|---|---|---|---|
| 6,061,739 A | 5/2000 | Reed et al. | |
| 6,233,616 B1 | 5/2001 | Reid | |
| 6,286,038 B1 | 9/2001 | Reichmeyer et al. | |
| 6,532,217 B1 * | 3/2003 | Alkhatib et al. ............. | 370/252 |

OTHER PUBLICATIONS

Comer, Douglas E., "Bootstrap and Autoconfiguration (BOOTP, DHCP)," *Internetworking With TCP/IP*, vol. I: *Principles, Protocols, and Architecture*, Ch. 21, pp. 372-373 (1995).
LeFebvre, William "Automatic IP Address Configuration," *Daemons & Dragons, Performance Computing*, pp. 49-51 (1999).
Miller, Philip "The Resolution of MAC Addresses," *TCP/IP Explained*, Ch. 4: Internet Addressing, pp. 60-65 (1997).

* cited by examiner

Primary Examiner—Robert B Harrell
(74) Attorney, Agent, or Firm—Hamilton, Brook, Smith & Reynolds, P.C.

(57) ABSTRACT

In one embodiment, a subnet mask is automatically determined by a first network node attached to a subnet in a packet communication network. The first network node issues plural communication packets from plural source addresses to at least one address known to be used in the subnet to evoke responses, and based on the presence or absence of responses from the network nodes at the known addresses, the first network node determines the subnet mask which represents the subnet.

23 Claims, 15 Drawing Sheets

METHOD AND APPARATUS FOR DETERMINING A SUBNET MASK BASED ON PRESENCE OR ABSENCE OF RESPONSES TO PLURAL COMMUNICATION PACKETS ISSUED DURING A SEARCH ITERATION

RELATED APPLICATIONS

This application is a Divisional of U.S. application Ser. No. 09/535,279 filed Mar. 24, 2000, now U.S. Pat. No. 7,281,036 which is a Continuation-in-Part of application Ser. No. 09/294,836, filed Apr. 19, 1999, now U.S. Pat. No. 6,345,294, granted Feb. 5, 2002. U.S. application Ser. No. 09/535,279 filed Mar. 24, 2000 also claims the benefit of U.S. Provisional Application No. 60/160,535 filed Oct. 20, 1999 entitled "Automatic Network Address Assignment and Translation Inference" and U.S. Provisional Application No. 60/178,063 filed Jan. 24, 2000 entitled "Method and Apparatus for Automatic Network Address Assignment" (now expired). The contents of the above applications are incorporated herein by reference in their entirety.

BACKGROUND OF THE INVENTION

A typical networking appliance product, such as a computer or personal communication unit, which might or might not have a keyboard or monitor and which might not yet have configured except for some factory standard material incorporated into it, must boot when installed into a local area network (LAN). Then, a person near that appliance can configure the appliance by filling out forms or typing in parameters into screens or into a terminal.

Alternatively, the appliance, when it is turned on, might send a message out on the LAN asking for any machine in the environment to tell it everything it needs to know in order to be useful, and if there is a boot server configured on the LAN, it will respond to the appliance by giving it some pre-configured information that will help the appliance configure itself. The information required by the appliance might include the name of the appliance, the network address of the appliance, and possibly the pieces of software to be installed in the appliance.

Thus, known techniques for initializing the network parts of an operating system or an appliance can employ the receipt by the machine of packets on a local network. According to certain protocols, a certain kind of message is sent into the LAN to see whether a response is received from a particular kind of server in the LAN. A machine that is in the process of booting might broadcast a boot request packet into the LAN, so that the request could be seen by any computer attached to the immediate LAN but not by far-away computers.

This well-known technology has been used by many people, companies, and organizations for computers that are booting, even for simple things such as sending network configuration information to a user's personal computer. When a personal computer on a LAN boots up, one of the first things that it might do is to send out a DHCP (dynamic host configuration protocol) request message or a boot request message, and a DHCP server or boot server on the LAN, configured by an information systems department, will reply to that request and authoritatively tell the personal computer its network configuration and a set of network parameters to use. This common technique for booting machines that require assistance in booting was employed by Sun Microsystems'® network workstations during the mid 1980s.

Today, it is quite common for computers in large organizations to be configured so that they will broadcast a specific kind of request in the form of packet when they are booting to obtain some kind of network configuration information. More specifically, according to a normal protocol for booting an appliance, the appliance, upon booting, uses software to broadcast a message in order to attempt to obtain network configurations and possibly other information required by the appliance. The appliance broadcasts a packet, which may be a bootp (booting protocol) request or a DHCP (dynamic host configuration protocol) request, using well-known technologies. DHCP is a protocol designed for configuring hosts dynamically, which means that the configuration of the host is not stored on the host or appliance itself, but rather is obtained dynamically by sending the DHCP request to a boot server and receiving a response. The appliance receives, in response, a short message that has a table of settings that include several parameters such as, an IP address of a gateway or router to use when sending packets to a far-away place, IP address to be used as the address of the computer itself, IP address to be used for sending messages to a web proxy server or HTTP proxy server, addresses of computers that provide naming services (so-called domain name servers), and bit field that is used as a network mask (which helps indicate to the routing computer which set of addresses are addresses of locally connected computers, thereby allowing the routing computer to distinguish them from addresses of far-away computers).

These five or six pieces of information can go a long way in configuring the network communication part of the software on the appliance. This is well-known technology. For example, in every Microsoft® Windows® 95, 98, or Windows® NT® operating system, there is an option in the network control panel that allows a user, rather than specify the IP address of the computer manually by typing into a box, to tell the computer using a dialog check box that every time it boots it should broadcast a message and try to obtain the IP address from a DHCP server. Microsoft® Windows® NT® servers are provided with a built-in DHCP server that can provide this IP address to other computers upon request.

There are also products being sold into business locations or office environments that, instead of being configured by a boot server, can be configured by a person with a computer, such as a so-called "lap top" computer, that is attached through some kind of cable to configure the appliance. Other products can be configured through use of an LCD panel and buttons. For example, a printer or photocopy machine, when it is booted up, might display a small message on a screen saying that the user must proceed through menus and select certain options for printer or copier. Similarly, a telefacsimile machine might require a user to set the phone number and the number of rings after which the telefacsimile machine will auto-answer. These configuration settings are typically stored within the product itself. If a printer, photocopying machine, or telefacsimile machine is damaged and needs to be replaced, it will be necessary for a knowledgeable person to configure a new machine.

Similarly, certain Internet-connecting network products, of which there are many, use roughly the same kind of style of configuration as the above-mentioned machines. A user purchases a product that is intended to be connected to a local network. The user connects the product to the local network and interacts with the network product to tell it its configuration. The configuration is stored on the network product itself, and if it is ever necessary to replace the network product, it will be necessary for someone (typically a system administrator) to configure the replacement network product.

SUMMARY OF THE INVENTION

The prior art requires a network product to be installed by someone familiar with and highly skilled in configuring the network product onto the network/subnet on which the network product is to operate. One of the major costs of owning and operating network products/appliances is, on an ongoing basis, having someone trustworthy and knowledgeable to keep the configuration of the network appliances such that reconfiguration may be done in the event of a system crash, network appliance failure, or other such event to cause a network appliance to lose its network configuration. Further, in networks/subnets not having a local server operating as a DHCP (dynamic host configuration protocol) server or boot server, then the process of installing a network appliance becomes a manually intensive task.

In accordance with one aspect of the present invention, a network address is automatically assigned to a first network node (hereafter referred to as an appliance) in a packet communications network, which carries inter-node communication packets to and from network nodes. The appliance communicates with at least one other network node to collect network address assignment information from inter-node communication packets. From the network address assignment information in the communication packets, the appliance determines an available network address. The appliance thereafter assumes the available network address.

To assist in determining an available network address, the appliance builds a list of network addresses determined to be on the network and a list of network addresses included in the inter-node communication packets but not determined to be on the network. The list of network addresses are used, in part, by the appliance to issue communications to the other network nodes at the collected network addresses. The communications are intended to evoke responses from the other network nodes that may provide deterministic information about the network addresses. Once network addresses have been determined to be on the network, they are copied from the undetermined list to the determined list. Typically, such a determination is learned from ARP request messages. To evoke deterministic communication messages, the appliance issues ICMP requests as general broadcast requests and local subnet broadcast requests. The issued requests may also include using directed ARP and ICMP requests, or a combination of each.

The appliance may be coupled to a subnet that is part of a wide area network (WAN), such as the Internet. In this subnet case, the appliance finds one local subnet node having an assigned IP address on the subnet. Then, to help find an unused IP address on the subnet, the appliance may (i) calculate an IP address that is external from the subnet, and (ii) while posing as a node having the external IP address, contact the local subnet node having the known, assigned, subnet IP address to determine whether it knows a subnet mask associated with the subnet. While finding the unused IP address, the appliance creates candidate subnet IP addresses and verifies that at least one of those candidate subnet IP addresses is not in use. To verify the subnet IP addresses are not in use, the appliance contacts the local subnet node at the known IP address while posing as each candidate subnet IP address. The appliance monitors for response network communication packets to gather deterministic network address information. It is possible that the above process may have caused an IP conflict, which may cause subnet devices to change their internal routing tables to indicate that the appliance is the router. Therefore, the process of verifying the addresses are not in use may include correcting an IP conflict.

In the subnet case, the appliance determines at least one subnet IP router address to enable the appliance to communicate beyond the subnet. To locate the subnet IP router, the appliance uses the determined, unused, IP address to provoke some responses from the other subnet nodes. Alternatively, or in conjunction, the appliance may contact the other network nodes to identify the router(s) from among those other network nodes. This may include setting a router variable to elicit a known, router-specific response.

The appliance may also determine a subnet mask for the subnet to which it is coupled. To isolate the subnet mask, the appliance searches potential subnet masks, in a binary search manner in one embodiment, to determine the boundary defined by the subnet mask; other typical search techniques applicable to isolating potential subnet masks may be used rather than a binary search. The boundary is located in-between ones and zeros when the subnet mask is represented as a binary number. To ensure the unused network address is not in use by another network or subnet device, the appliance performs a final check of that potentially unused IP address. In the event an IP conflict occurs during the final check, the appliance provides a means for correcting the IP conflict.

In one application, the assigned address is used temporarily to retrieve a permanent network configuration, which includes a permanent network address. The appliance determines an available local subnet address. Using the available local subnet address, the appliance accesses a second appliance located outside the local subnet address for a permanent network configuration from a list of permanent network configurations. The permanent network configuration, including address, is then assumed by the accessing appliance, replacing the temporarily assumed, available, local subnet address.

Another aspect of the present invention causes nodes on a network to correct an entry for a node in address tables. The appliance, or other node performing the task of causing the correction(s) uses an unused address on the network to prepare a request to the node for which the entry is to be corrected. The request is forwarded to the node to cause a responsive request from the node. The responsive request causes the network nodes to correct the address tables of the network nodes to include an address for the node which is identified in the responsive request from the node.

In one embodiment, the unused address is determined based on the address of the node for which the entry is to be corrected. There may be a plurality of requests which are issued to the node from addresses possibly unused. Some of the requests may be ICMP packets.

A determination may also be made to determine whether the node for which the entry is to be corrected responsively issued a message that is expected to correct the entry for the node in address tables. In one form of network communications, the message responsively issued is an ARP request. If the node for which the entries are to be corrected does not provide a response to correct the entries, the nodes seeking to correct the entry for the node may issue a network packet for the node that will correct the entries. The message issued is an ARP request in network communications supporting the ARP protocol.

Another aspect of the present invention automatically determines a subnet mask applying to a subnet on which the node determining the subnet mask is attached. Plural communication packets are issued from plural source addresses to at least one address known to be used in the subnet to evoke responses. Based on the presence or absence of responses from the network nodes at the known addresses, the subnet mask which represents the subnet is determined.

This process may further include identifying plural source addresses just inside and outside a possible subnet mask. The plural source addresses may be randomly selected. From these plural source addresses, the appliance may forward a message to a known address on this subnet from the source addresses. The message may be an ICMP request. Determining the subnet mask may be based on whether a response is received from the known address. Determining the subnet mask may include determining whether a node having the same address as a source address has been observed issuing other subnet communications. The node continues to issue communication packets and determine whether the subnet mask is isolated until a response is received from just within a possible subnet mask and not from just outside the possible subnet mask. This continues until exhausting possible subnet masks. While searching for the subnet mask, an appropriate search method, such as a binary search is applied.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
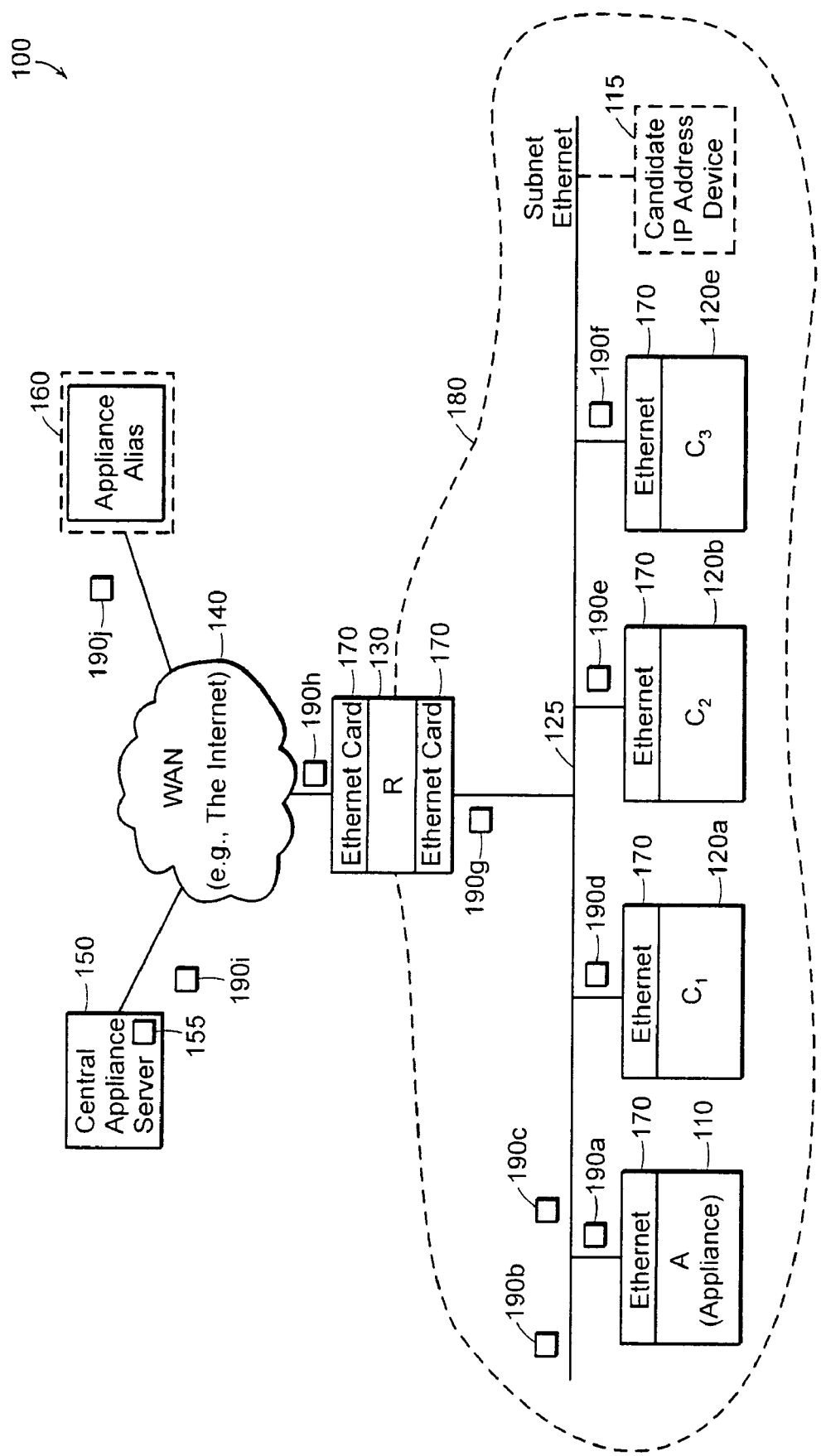
FIG. 1 is a block diagram of a network in which the present invention is deployed.

FIG. 1 is an example of a network 100 in which the present invention is deployed. The network 100 includes a network (WAN) 140 (e.g., the Internet), central appliance server (CAS) 150, appliance alias 160, router 130, and subnet 180. The subnet 180 couples to and communicates with the WAN 140 through the router 130.

The subnet 180 includes an ethernet 125. Coupled to the ethernet are three computers, $C_1$ 120a, $C_2$ 120b, and $C_3$ 120c. Also coupled to the subnet ethernet 125 is an appliance (A) 110 and router 130. Every electronic device 110, 120, 130 coupled to the ethernet 125 includes an ethernet card 170. For simplicity, the ethernet cards are all depicted as being the same type. Note that the router (R) 130 has two ethernet cards 170—one coupled to the ethernet 125 in the subnet 180 and the other coupled to the WAN 140.

The devices 110, 120, 130 found at various locations around the network 100 may be referred to as network nodes. Other forms of network nodes include telephones, cellphones, fax machines, hand-held network devices, etc., and/or software residing on any of the devices aforementioned, including multiple software processes operating on a device.

As described in application Ser. No. 09/294,836, now U.S. Pat. No. 6,345,294, granted Feb. 5, 2002, incorporated herein by reference, the appliance 110 seeks to establish an IP address on the ethernet 125 in the subnet 180. The appliance 110 has limited knowledge about its "world" when it is first connected to the ethernet 125. For example, the appliance 110 typically knows about the central appliance server 150. Before shipping to a customer, the appliance 110 is loaded with processing routines and limited network information, such as the CAS 150 address on the WAN 140, but it does not know about the computers 120 nor router 130 on the ethernet 125.

The appliance 110 is depicted as a stand-alone "box". However, the appliance 110 may be deployed in other forms. For example, the appliance 110 may be reduced to a circuit board residing in a computer 120, software in a personal communication unit (PCU, not shown), single chip integrated into a network device including wireless phones, or incorporated or retrofitted into a network device such as the router 130.

The appliance alias 160 is depicted as a network device, but it represents any device having an outside_network address (i.e., IP address external from the subnet 180). Reference is made to the appliance alias 160 throughout the discussion to represent the appliance 110 posing as a device having an IP address external from the subnet 180. The appliance alias 160 does not exist in physical form.

Communication among the devices 110, 120, 130, 150 is transacted through information/communication/data packets 190 (also referred to as information packets, data packets, communication packets, or just "packets") traveling on the network 100 (e.g., ethernet 125). The packets 190 are individual packets 190a-j, where the packets 190 include header information for traveling across the network 140 and subnet 180. The header information follows standardized, packet, communication protocols specified by the local network configuration information. Examples of standardized, packet, communication protocols are the U.S. TCP/IP protocol and the European ISO protocol. The present invention is described as using the physical layer and the IP layer of a standardized, packet, communication protocol in carrying out its operations. However, the principles of the present invention is not limited to requiring the physical and IP layering information; the present invention is adaptable and suitable for future communication protocol changes and improvements. This description is based on having the ability to manipulate any field in an ETHERNET packet, which includes (source ETHER, destination ETHER) and/or (source iP, destination iP). Note that ETHERNET and ETHER are used interchangeably in this discussion. Further, the present invention is not bounded by a particular software language or data structure, as will be apparent from the following discussion.

Figure 2:
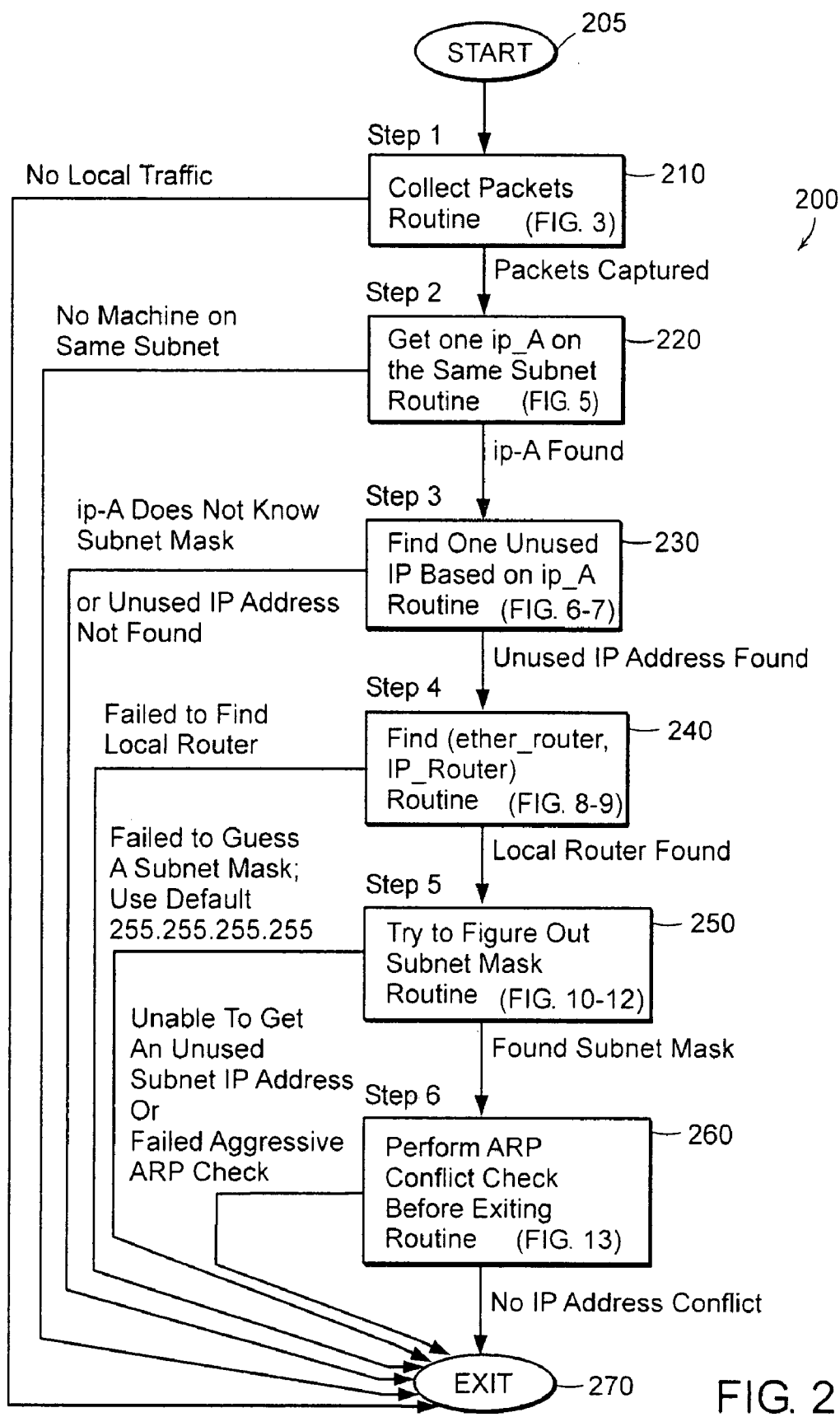
FIG. 2 is a flow diagram of an embodiment of a generalized process operating on a network appliance depicted in the example network of FIG. 1.

FIG. 2 is a high level flow diagram of a main processor routine 200 of an embodiment of the present invention. All references to hardware to which the main processor routine 200 applies refer to the network 100 and network nodes/devices 110, 120, 130, 140, 150 shown and described in FIG. 1.

The appliance 110 includes an embodiment of the main processor routine 200, which seeks to automatically determine an available network or subnet address. In one application, the main processor routine uses the available network address temporarily before accessing and assuming a permanent network configuration, which includes a permanent address. In both cases, the appliance 110 achieves respective results without human support.

To assign a permanent address, the following broad method is employed: (i) by the appliance 110 using a processor routine 200 (discussed in detail below), find an available network address to assume that available network address, and (ii) access a permanent configuration database to get a permanent network configuration. In the case of a simple local area network (LAN), the appliance may employ the broad method just discussed to determine a permanent, available, network address, which is simply an unassigned LAN address. However, in the case of a wide area network (WAN) 140, such as the Internet, the appliance 110 (i) finds an available address on a subnet 180 LAN/ethernet 125, (ii) locates a subnet router 130, (iii) accesses a central appliance server 150, (iv) then receives and assumes/applies a permanent, available, subnet IP (Internet Protocol) configuration. A subset of this more elaborate method may be employed depending on information known by the appliance 110 before starting the process of getting the configuration.

The main focus of the following discussion and description of FIGS. 2-14 is parts (i) and (ii) of the WAN 140 scenario. As discussed in more detail below, the appliance 110 operates a processor routine having an embodiment of the present invention with six steps for determining network 100 and subnet 180 knowledge. Each of the six steps uses ARP, ICMP, or UDP packets, or a combination thereof, to glean network address assignments and topology information. The appliance 110 seeks to establish relationships between MAC and IP addresses. Having determined these MAC/IP address relationships, the appliance 110 can determine an available subnet 180 address, and use the information to locate the electronic/network address of the router 130. Once the appliance 110 has a subnet 180 IP address and knows the router 110 address, the appliance 110 is able to access a database 155 of configuration information, which is available in the central appliance server 150. The following discussion provides details of an embodiment for the general description outlined above.

The main processor routine 200 operates on the appliance 110 and provides for both types of subnets: stand-alone subnets (not shown) and subnets 180 coupled to a WAN 140 through a router 130. The following description of the embodiment of the main processor routine 200, and all (sub) routines included therein, is for the WAN 140 scenario example of FIG. 1.

The main processor routine 200 initiates operation of the automatic network assignment process in step 205. Typically, initialization/start 205 occurs during a power-up sequence of the appliance 110, during a soft-boot or hard-boot operation, or upon an externally supplied start command from a subnet device (e.g., computer 120 or router 130). Step 205 includes initializing software variables and hardware subsystems in the appliance 110 and may also provide for certain power and data communication port checks, such as determining the status of the appliance 110 ethernet interface 170 coupling the appliance 110 to the ethernet 125. Each device 110, 120, 130, etc. has a unique ETHERNET address because every ethernet card 170 includes a universally unique ethernet address. For the purpose of this discussion, MAC and ETHER mean the same thing. Both refer to an ETHERNET address, for example, "00:90:57:90:1d:ef".

After completion of the initialization in step 205, in a collect_Packets routine 210, the appliance 110 gathers information about the network 100 and the subnet 180 by collecting packets 190a, 190b, 190c, 190d, 190e, 190f being transmitted over the ethernet 125. Since the network devices 120, 130 generally issue many packets 190 to communicate with one another, and a lesser number to inform each other that each is still on-line, network device and topology information may be retrieved from those packets 190 by capturing and parsing the packet 190 header fields (not shown, but common in the art). For example, from the communication packets 190, it is possible to determine which IP addresses are in use, which ether/mac addresses are on the network 100, which IP is used by which MAC address, which ether/mac address corresponds to which IP address, and so on.

In general, the collect_packets routine 210 follows the following process. (1) The collect_packets routine 210 "listens" to network packet 190 traffic on the ethernet 125 through the appliance 110 ethernet interface 170 for a period of time, e.g. one minute. From the collected packets 190, many pairs of (ether, iP) associations are collected. (2) The collect_packets routine 210 tries to get more packets by using an ICMP contact to the following addresses: 255.255.255.255 and 224.0.0.1, a broadcast address and an "all systems on this subnet," respectively. 255.255.255.255 is a broadcast address. When one machine tries to "ping" that address, generally many machines will respond (except some machines, such as machines running the Microsoft® WINDOWS® operating system). 224.0.0.1 means, "all systems on this subnet." When one machine tries to "ping" this address, generally many machines will reply. However, some machines, such as machines running the Microsoft® WINDOWS® operating system still do not like it. (3) The collect_packets routine 210 exits if no packets 190 are collected during any phase of its process and asserts "no local traffic" in such an event. The "no local traffic" message is issued to an interface, where the interface may be a machine-human or machine-machine interface.

However, in the event packets 190 are collected by the appliance 110, the collect_packets routine 210 does the following. Based on information included in headers of the collected packets 190, the routine 210 initializes and assigns the MAC and IP address information to one or more lists, in this embodiment, including: a watched_ip_list, watched_ether_list, used_ip_mac_table, and used_mac_ip_table, discussed later in detail in reference to FIG. 4. The watched_ip_list includes all ips but 0.0.0.0 (an address unused by any device but which may be used to indicate "self" in a packet, such as ARP or ICMP), and those IP addresses in the self-forwarding message (source and destination ether addresses describe the appliance 110 itself) and ICMP messages. In the used_ip_mac_table and used_mac_ip_table, only (source_ether, source_ip) pairs are collected from ARP request messages. Note that ARP reply messages might be intentionally misleading (i.e., bogus) because of the possibility of a so-called "proxy" ARP. Other processing routines 220-260 use the MAC and IP addresses accumulated in these tables.

Figure 3:
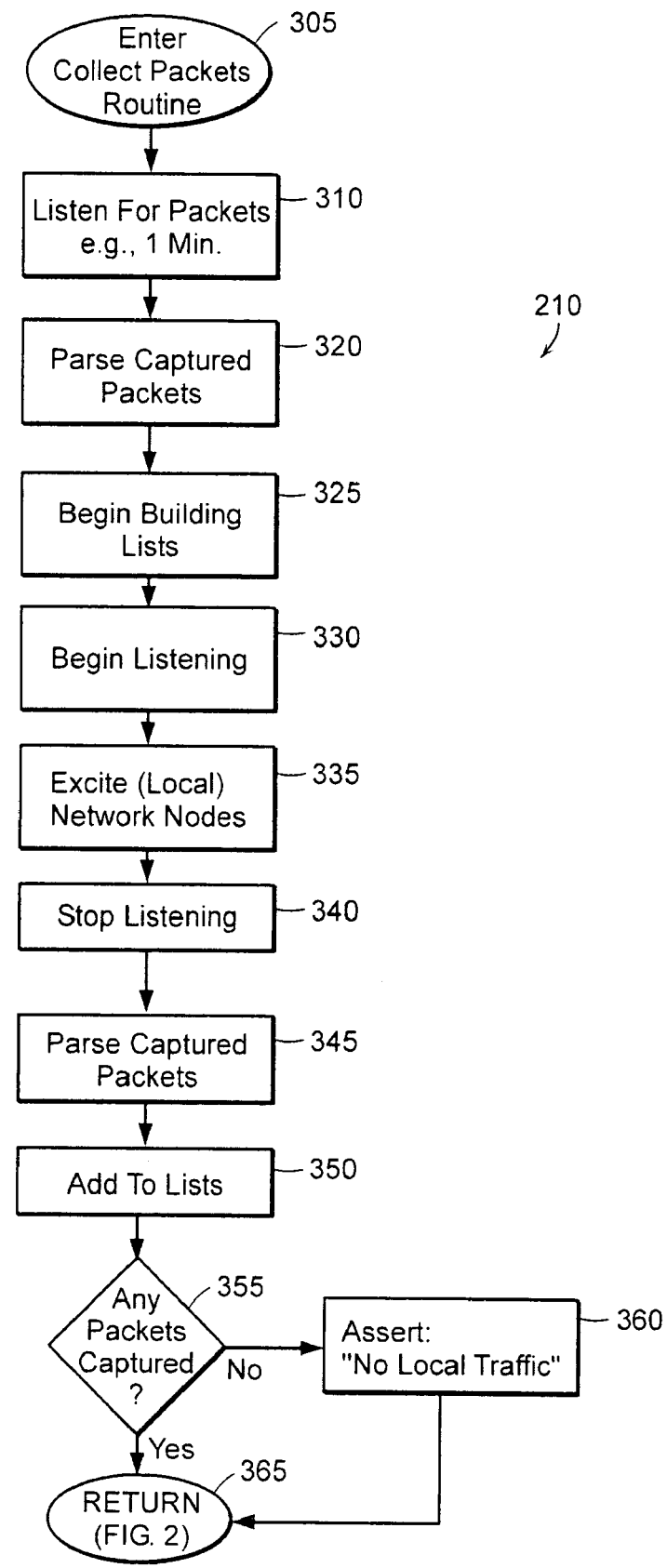
FIG. 3 is a flow diagram of an embodiment of a detailed process of a first step of the process of FIG. 2.

FIG. 3 is a flow diagram of a detailed process embodiment of the collect_packets routine 210. Depending on the network 100 or subnet 180 topology or device quantity, which may translate into higher or lower network traffic volume, this routine 210 may adapt to reflect and capture such network traffic volume. For example, the collect_packets routine 210 may collect data packets 190 for one minute in a high volume data packet traffic situation, and may collect five minutes worth of packets 190 in a low volume packet traffic situation.

After entering the collect_packets routine 210 in step 305, in step 310, the routine 210 "listens" for packets 190 traveling on the subnet ethernet 125. As discussed above, in one embodiment, step 310 lasts for one minute; in an alternate embodiment, the duration adapts depending on the amount of network packet 190 traffic occurring.

The appliance 110 collects all the packets 190 "heard" during the listening step, step 310. "Listening" for packets 190 includes collecting packets 190, which results in getting many packet (ether, iP) pairs. In one embodiment, step 310 retains all duplicate packet pairs. In an alternate embodiment, step 310 filters duplicate packet pairs. In yet another embodiment, a pre-filter (not shown) is used to store only MAC and IP addresses, dispensing with the rest of the packet 190 in a real-time manner.

In step 320, the captured packets 190 are parsed for the (ether, iP) pairs. The parsing retrieves individual MAC and IP addresses. Like step 310, duplicates filtering may be employed during this parsing step 320.

In step 325, lists of so-called known and "possible" subnet devices (e.g., computers 120) are begun (i.e., initialized, defined, allocated, etc.), where the lists are initially filled with the data captured during the listening and parsing steps 310, 320, respectively. Recalling that ARP and ICMP messages (and others) have both request and reply types, it should be understood that not all (ether, iP) pairs are deterministic. In other words, in at least one ARP or ICMP message type—ARP request—the (mac/ether, iP) pairs are indeed pairs (i.e., the mac/ether address of the ether card 170 is in the same device 120a as the IP address assigned to that device 120a); in other ARP or ICMP message types, the (mac/ether, iP) pairs are indeterminate, not necessarily belonging to the same physical device 120a. Therefore, in one embodiment, the processor routine 200 uses multiple lists for storing deterministic and indeterminate MAC and IP addresses.

Figure 4:
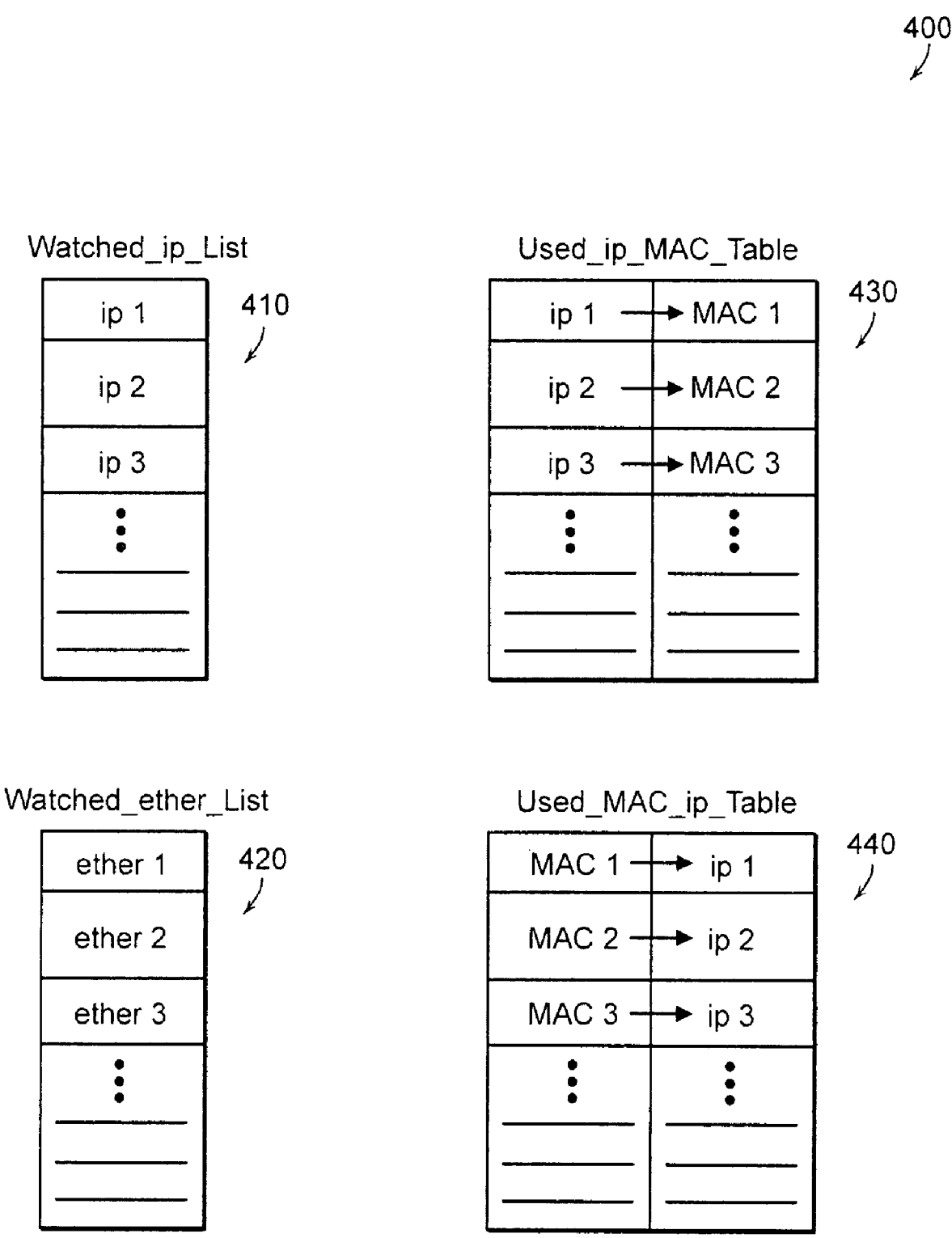
FIG. 4 is a block diagram of tables the process of FIG. 2 uses for learning address information of nodes on a local subnet.

FIG. 4 includes illustrations of the indeterminate and deterministic lists 410, 420, 430, 440 (collectively 400) that are initialized by step 325 (FIG. 3). In this embodiment, there is a watched_ip_list 410, watched_ether_list 420, used_ip_mac_table 430, and used_mac_ip_table 440. Each list 410, 420, 430, 440 includes unique information, as discussed in turn below.

The watched_ip_list 410 includes IP address data from the packets 190 "heard" and parsed during the listening and parsing steps 310, 320 (FIG. 3), respectively. The term "watched" indicates "indeterminate" or "probable." As an IP address (e.g., IP1, IP2, IP3, and so on) becomes associated with a particular respective MAC address, the IP address is added to a "used" list 430, 440. The watched_ip_list 410 includes all IP addresses, but 0.0.0.0 and those IP addresses in a self-forwarding message and ICMP messages.

The watched_ether_list 420 includes ether/mac address data from the packets 190 "heard" and parsed during the listening and parsing steps 310, 320 (FIG. 3), respectively. Like the watched_ip_list 410, the term "watched" indicates "indeterminate." As an ether address (e.g., ether 1, ether 2, ether 3, and so on) becomes associated with a respective IP address, the ether address is added to one or both of the "used" lists 430, 440.

The used_ip_mac_table 430 stores mappings from a unique IP address to its corresponding MAC address. The term "used" indicates that the address mapping has been determined to be assigned to a device 200. For our purposes, a MAC address is equivalent to an ether address and is being used to distinguish between indeterminate ether addresses and deterministic (i.e., determined) ether/mac addresses. In the used_ip_mac_table 430, the collect_packets routine 210 only stores (source_ether, source_ip) pairs to the "used" lists 430 found in ARP request messages because an ARP reply message might be "bogus" because of a so-called "proxy" ARP.

The used_mac_ip_table 440 stores mappings from a unique MAC address to its corresponding IP address. The term "used" is the same as for the used_ip_mac_table 430.

During operation, the main processor routine 200, and (sub)routines 210-260 included therein, seeks to copy IP addresses from the watched_ip_list 410 to the used_ip_mac_table 430, and ether addresses from the watched_ether_list 420 to the used_mac_ip_table 440. The processor routine 200 then attempts to find matches for the IP addresses in table 430, and MAC addresses in table 440. The matching MAC and IP addresses are determined from ARP request messages, for the reason described above. Completing the used_ip_mac_table 430 and used_mac_ip_table 440 provides the appliance 110 with specific knowledge about its subnet 180, and its knowledge of the network 100, in general.

Referring again to FIG. 3, after the collect_packets routine 210 has stored the packet information into the lists/tables 400 in step 325, the collect_packets routine 210 begins to listen to subnet ethernet 125 packet 190 traffic again. In this part of the routine 210, the collect_packets routine 210 will be capturing appliance-induced network packet 190 traffic, as described immediately below (as opposed to capturing the non-induced network packet 190 traffic, as in step 310).

Step 335 causes network 100 and subnet 180 packet 190 traffic; in other words, devices 120, 130, etc. responsively put packets onto the network 100, where packets traveling between devices on a network is loosely referred to as "traffic." In one embodiment, the excite local network devices 120 (FIG. 1) step 335 sequences through the IP addresses stored in the watched_ip_list 410 (FIG. 4). Pseudocode statements to excite (generate packets 190 from) the devices 120, 130 may include:

For IP in watched_ip_list 410 {
(i) send ICMP request using (my_ether, IP) to ('ff:ff:ff:ff:ff:ff', 255.255.255.255),
(ii) send ICMP request using (my_ether, IP) to ('ff:ff:ff:ff:ff:ff', 224.0.0.1) }, where my_ether is the appliance 110 ethernet 125 address, IP is an IP address retrieved from the watched_ip_list 410, ('ff:ff:ff:ff:ff:ff', 255.255.255.255) is a broadcast address, and ('ff:ff:ff:ff:ff:ff', 224.0.0.1) is an address that means "all systems and subsystems on this subnet 180."

The appliance 110 uses the pseudocode statements to provoke/elicit address information from the other network devices 120. So here statement (i) "pings" the broadcast address, which causes many machines 120, except some machines such as machines using the Microsoft® Windows® operating system, to respond. Using the 224.0.0.1 address, statement (ii) "pings" all systems 120, 130 on the subnet 180. Many machines 120, except some machines such as those employing the Windows® operating system, generally respond. From the response packets 190 captured by the appliance 110, the collect_packets routine 210 parses network device 120, 130 address data.

In step 340, the collect_packets routine 210 stops listening for packets from the computers 120, router 130, and possibly other devices not shown and devices elsewhere in the network 100. Like steps 320 and 325, the captured packets 190 are parsed and added to the lists 400 (FIG. 4) in steps 345, 350, respectively. An "any packets captured" query 355 tests, by scanning the lists 400 or checking a software flag, to determine if any packets 190 were captured during steps 310-350. A "no packets captured" determination indicates that the appliance 110 may not be connected to the subnet ethernet 125; the collect_packets routine 210 in turn asserts a "no local traffic" message in step 360, then returns to the main processor routine 200 (FIG. 2). If packets 190 have been captured, the collect_packets routine 210 returns to the main processor routine 200 for further processing.

Referring again to FIG. 2, if packets are unable to be collected in the collect_packets routine 210, then the main processor routine 200 exits in step 270. A higher-level routine (not shown) restarts the main processor routine 200 after a specified period of time to retry automatic network configuration. If, however, packets 190 are collected in the collect_packets routine 210, the appliance 110 main processor routine 200 next attempts to determine at least one IP address on the same subnet 180. The "get one ip_A on the same subnet" routine 220, or, simply, get_ip_A routine 220, is used to do this. Note, the term "ip_A" indicates a determined address, on the same subnet 180 in this case.

Figure 5:
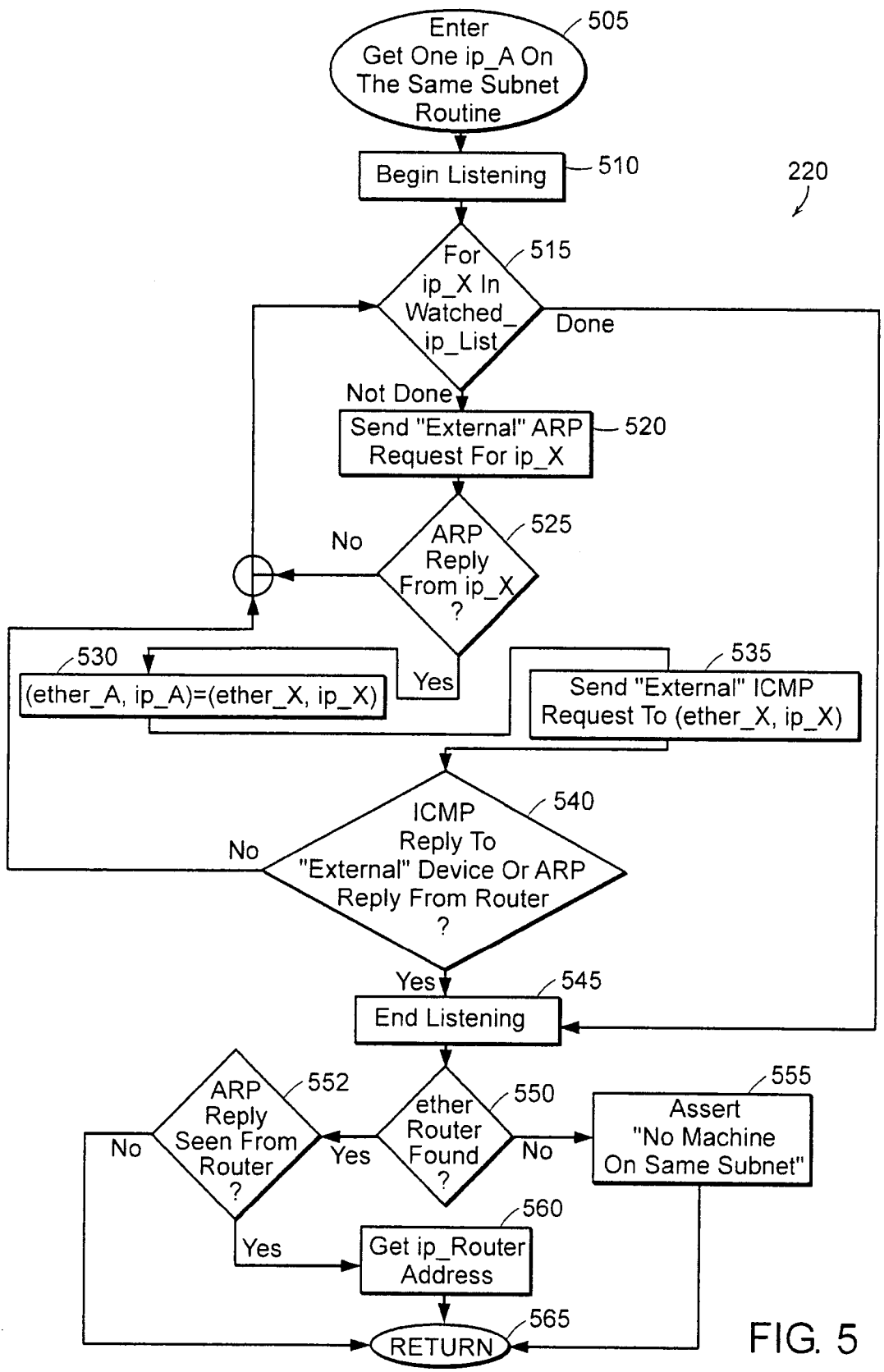
FIG. 5 is a flow diagram of the second step of FIG. 2.

FIG. 5 is a detailed flow diagram of a process embodiment of the get_ip_A routine 220. This routine 220 looks for a used "slot" (i.e., computer/device 120 definitely on the IP subnet 180) with which the appliance 110 may locally communicate during later, main processor routine 200, process steps 230-260 (FIG. 2).

The get_ip_A routine 220 begins in step 505, where initialization occurs. The routine 220 then begins "listening" to network traffic in step 510. Between steps 510 and 545, the routine 220 communicates with IP addresses stored in the watched_ip_list 410 to elicit/provoke communication packet 190 traffic. The communication packets 190 potentially include information for adding more IP addresses and/or ether addresses from the so-called indeterminate lists 410, 420 to the so-called determined lists 430, 440 (FIG. 4).

A loop begins in step 515, which sets up a counter ip_X to traverse through the watched_ip_list 410 IP addresses. If the loop is determined to be "done," the FOR loop terminates listening for packets 190 in step 545. If the FOR loop is "not done," then the body of the loop (steps 520-540) is performed. In step 520, an "external" ARP request for ip_X is sent from the appliance 110. By external, it is meant that the appliance pretends to be (my_ether, ext_ip), where my_ether is the appliance 110 ethernet 170 address, and ext_IP is a known, unassigned IP address that is not an IP address in the range of IP addresses of the subnet 180. For example, if the subnet 180 has an IP address range between A.B.C.D1-A.B.C.D2, where letters A, B, and C range from 0 to 255 and D1-D2 represent a range between 64 and 127, then IP addresses such as A.B.C.D3 or A.B.C.D4, where D3 and D4 range from 0 to 63, such as 45 or 0, are potential external addresses used as the appliance alias 160 IP address, or the CAS 150 IP address may be used as ext_IP during these communication steps.

In contacting/communicating with all the devices 120, 130 at IP addresses that were collected in the collect_packets routine 210 (FIG. 2), this routine 220 should be able to get at least one device 120 to reply to a request from an external device, for example, the central appliance server 150. Since no router will do an ARP_fake for the CAS 150, i.e., in practice, the CAS 150 does not have an ARP_fake router associated with it, this step is effective to pick an ip_A (known IP address on the subnet 180) which is on the same subnet 180, no matter if there is an ARP_fake router on the subnet or not.

Proxy_arp or ARP_fake means that one machine (e.g., router 130) might reply to an ARP request message from an internal machine (e.g., C1 120a) to outside_subnet machines. Generally, machines that reply for (i.e., representing, doing the ARP_fake) outside_subnet machines are routers. For example, assume a subject subnet includes IP addresses in the range, A.B.C.D1-A.B.C.D2. One machine, A.B.C.D3, on the subject subnet might request, "who has A.B.C.D4, tells A.B.C.D3". In this message, IP address A.B.C.D4 is clearly outside of the subject subnet, and no machine on the subject subnet is supposed to reply to that ARP request message. But, if a router on the subject subnet, A.B.C.D5, where D5 has a value between the range of 64 and 127 such as 65, (MAC is gg:hh:ii:jj:kk:ll, where g, h, i, j, k and l have a value between the range of 0-f in hexidecimal), is doing ARP_fake, it will send out an ARP reply saying "A.B.C.D3 is at gg:hh:ii:jj:kk:ll". In this way, if machine_X wants to send a message to A.B.C.D3, it will send the message to the router, which is correct in reality. One exception for that is no ARP_fake router will do that for any reply from an outside_subnet IP address (i.e., outside the subject subnet). For example, if a machine sends out an ARP request saying "who has A.B.C.D6, where D6 has a value between the range of 0 to 63 such as 43, tells A.B.C.D4", the router, A.B.C.D5, will not do ARP fake (if it is doing that), since A.B.C.D4 is an outside_subnet IP address.

Referring again to FIG. 5, since only the IP address of the central appliance server 150 is used, and that address is universally assigned to the appliance 110 manufacturer, this step is free from IP conflict.

Continuing with the get ip_A routine 220, a determination is made in step 525 if an ARP reply is seen (in a communication packet 190) from the device 120, 130 at ip_X. If an ARP reply has not been seen, then the loop returns to step 515. If an ARP reply has been found, as determined by step 525, then the loop continues to step 530.

In step 530, an assignment is made, storing the (MAC, iP) addresses from the device(s) 120, 130 successfully provoked by step 520. Specifically, (ether_A, ip_A) is assigned the values of (ether_X, ip_X). In other words, step 530, in one embodiment, fills in two horizontally adjacent fields (i.e., included in a same database record) in the used_mac_ip_table of 440 (FIG. 4). Because the appliance 110, posing as device external from the subnet 180, sends the ARP message in step 520, another computer on the local network/subnet 180 may issue ARP replies. Of course, the packets 190 may be of deterministic or indeterminate value since the router 130 may be pretending to be an IP address other than the network address it really is (as in proxy and network address translation routers).

To have more chances (i.e., evoke more responses) to find router 130, in step 535, the appliance 110, again posing to be a device external from the subnet 180 (e.g., central appliance server 150), sends an "external" ICMP request to the address (ether_X, ip_X). If the (ether_X, ip_X) address is an address/node (e.g., $C_1$ 120a) on the local subnet, that node must send a response to the router 130 in order to communicate with that "external" device. Such a determination is made in step 540, where the ICMP reply to the "external" device or ARP reply from the router 130 is determined from communication packets issued by either the computers 120 or the router 130. Since determining either an ICMP reply to, for example, (ether_router, CAS 150) or an ARP reply from (ether_router, ip_router) is deterministic (i.e., confirming (ether_A, ip_A) from step 530), then the loop is done and exits to step 545 to terminate listening for network communication packet 190 traffic. Otherwise, the loop continues at step 515.

If the router 130 is determined to have been found in step 550, then a query 552 determines if an ARP reply has been seen coming from the subnet router 130. If an ARP reply has been seen, then the corresponding router address is stored in either list 430, 440 (FIG. 4), or a different list not shown but which also supports knowledge of one or more routers, particularly the router 130 on the same subnet 180 as the appliance 110. If no ARP reply has been seen coming from the subnet router 130, then the process returns in step 565 to the main processor routine 200 (FIG. 2).

Following step 560, the get_ip_A routine 220 returns control to the main processor routine 200 (FIG. 2) in step 565. If no ether_router is identified during the get_ip_A routine 220, then an assertion is made in step 555 that "no machine has been found on the same hub." After such assertion, the get_ip_A routine 220 is completed in step 565, returning control to the main processor routine 200 (FIG. 2).

Referring again to FIG. 2, if an ip_A was not found by the get_ip_A routine 220, then no machine/node is determined to be on the same subnet, and the main processor routine 200 exits in step 270. However, if an ip_A is determined to be on the same subnet by the get_ip_A routine 220, then packets 190 have been collected in the collect_packets routine 210, and an IP address on the local subnet has been determined in the get_ip_A routine 220. Now, using the determined subnet address, ip_A, one unused IP on the subnet is determined in the "find one unused IP based on ip_A" routine 230, also referred to as the find_unused_IP routine 230.

Figure 6:
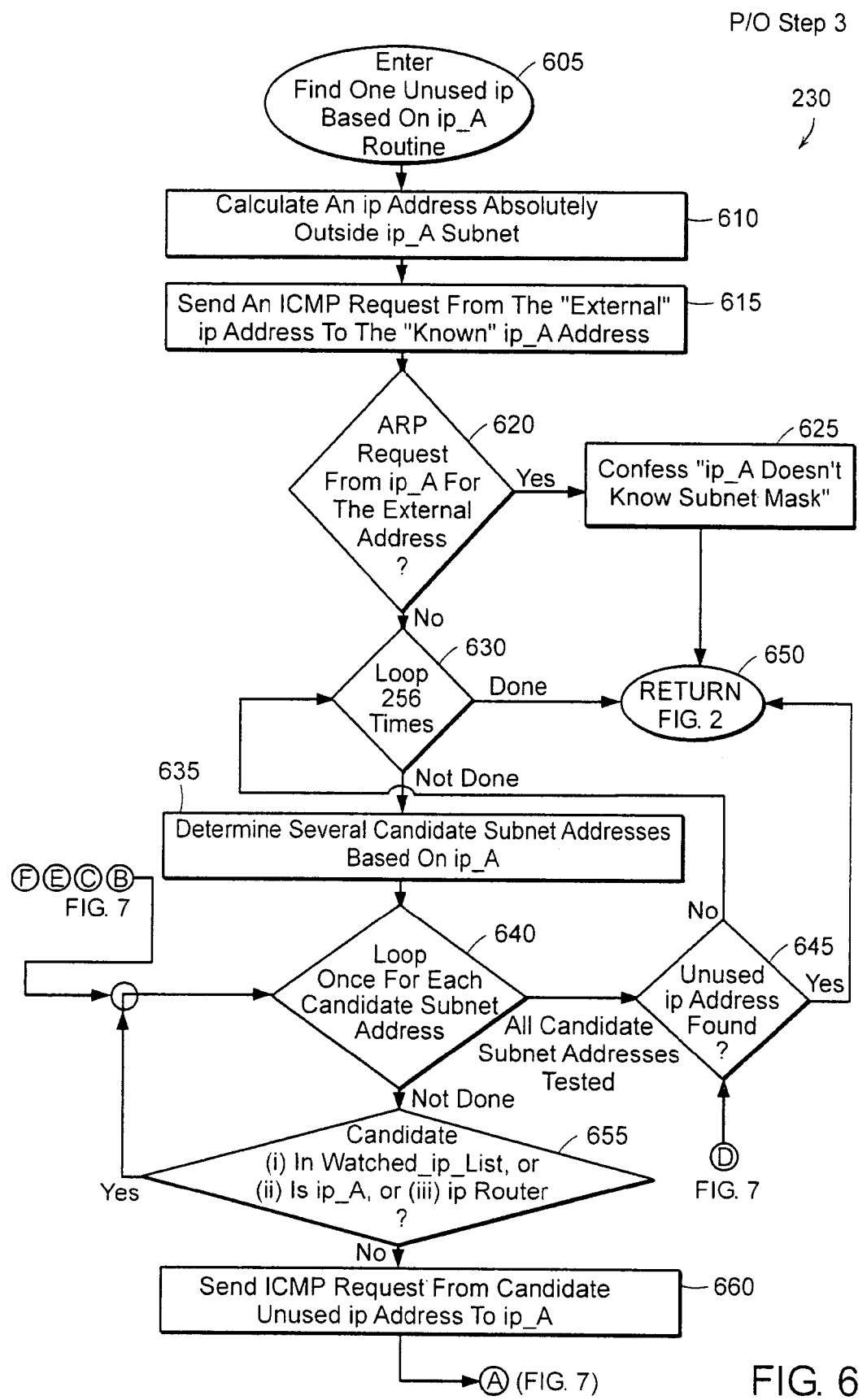
FIG. 6 is a first part of a flow diagram of the third step of FIG. 2.
Figure 7:
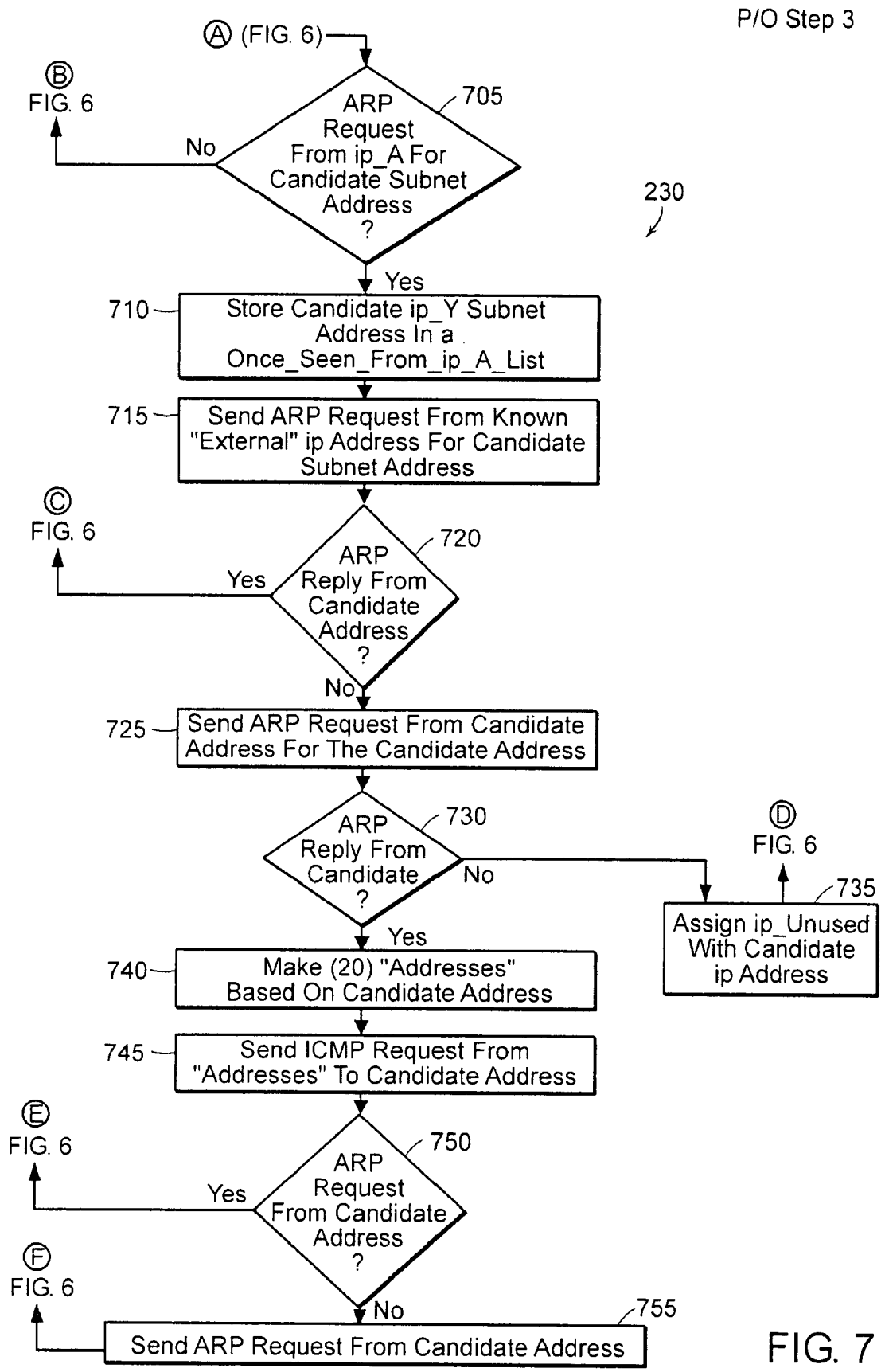
FIG. 7 is a second part of a flow diagram of the process of the third step of FIG. 2.

FIG. 6 is a flow diagram of an embodiment of a process used to determine an unused IP address based on the "known" IP address, ip_A, determined during the get_ip_A routine 220. In general, the find_unused_IP routine 230 seeks to determine an unused IP address over a certain range of IP addresses that are possibly located in the subnet 180 to which the appliance 110 is coupled. The following discussion includes usage of ARP and ICMP communication packets, so a short description of each is provided now.

(a) ARP Contact:

For machine_X to confirm if one IP address is in use or which machine owns a specific IP address, machine_X generally sends out a broadcast packet saying: "who has ip_Y tell (mac_X, ip_X)". If some machine has that ip_Y, an ARP reply is sent to mac_X as "ip_Y is at mac_Y telling mac_X". If there is no ARP reply after an ARP request, generally it means no other machine owns that IP address. To confirm that conclusion, machine_X may send out the broadcast packet two or three times.

A disadvantage to sending out an ARP message, such as "who has ip_X tell (mac_X, ip_X)," is that it might cause IP conflict if the IP address is really being used by another machine. Note, however, to avoid bad information from polluting ARP caches on the network, a host sending an ARP message (probe) may set its own IP address in the ARP packet to 0.0.0.0. An advantage for sending out an ARP message is that it is the most deterministic way to determine if one IP address is in use or not. No machine intends to delay a reply to an ARP request.

(b) ICMP Contact:

An ICMP contact is familiarly known as what a so-called "ping" does. Here, machine_X sends out an ICMP request saying "(mac_Y, ip_Y), please respond to (mac_X, ip_X)." If ip_Y is outside machine X's subnet, mac_Y will be the subnet router's MAC address. Generally, ip_Y will reply as "(mac_X, ip_X), (mac_Y, ip_Y) is responding to you". Again, if ip_Y is outside machine_X's subnet, mac_Y is the router's ETHER address. One valuable point to this process is that if ip_Y thinks ip_X is the same subnet and there is no ARP entry in its ARP table, it will first send out an ARP request. This provides a way for determining if ip_Y thinks one IP is in the same subnet or not. The snap shot of the ARP table is provided again for easy reference:

interface: W.X.Y.Z, where letters W, X, Y and Z range from 0 to 255 on interface 2.

| Internet (IP) Address | Physical (mac/ether) Address | Type |
|---|---|---|
| W1.X1.Y1.Z1 | gg:hh:ii:jj:kk:ll | Dynamic |
| W2.X2.Y2.Z2 | gg:hh:ii:jj:kk:ll | Dynamic | where W1, X1, Y1, Z1, W2, X2, Y2 and Z2 range from 0 to 255.

A machine adds a complete entry to the ARP table if it can receive an ARP reply after it sends out an ARP request. When one machine tries to deliver a message, such as ICMP reply, it must have a complete ARP entry in its ARP table for the destination machine, which means it will first send an ARP request for the destination machine first.

The advantage for using an ICMP contact is that an ICMP request message may be sent without causing any IP conflict. A disadvantage for using an ICMP contact is that machines might not give any kind of reply if they have an ARP incomplete entry in their ARP table, and they have confirmed it for some time.

Continuing to refer to FIG. 6, while posing as each possible, unused, IP address over the range of possibly unused IP addresses, the appliance 110 ARP contacts ip_A to see if ip_A will send an ARP request for the unused IP address. If ip_A sends an ARP request for that potentially unused IP address, the routine 230 concludes that IP address is in the subnet 180. Further processing is then done to determine that the IP is not in use. In one embodiment, this determination is done by using the IP address of the central appliance server 150 to ARP contact the potentially unused iP; if there is no ARP reply from that potentially unused iP, then the routine 230 concludes that the potentially unused IP address is not in use. If no IP address is found to be unused in the range of possibly unused IP addresses, then a confession is made that the routine 230 has failed to find an unused IP address. The following discussion includes details of one embodiment of the find_unused_IP routine 230.

In step 605, the routine 230 performs parameter passing from the higher level routine 200 (FIG. 2) and initialization of local variables for the find_unused_IP routine 230.

An IP address located absolutely outside the subnet 180 is calculated in step 610. In one embodiment, calculating an IP address absolutely outside the subnet 180 on which the determined IP address device (e.g., computer 120a, which for the purposes of this discussion will be used as the so-called "determined IP address device," ip_A). In one embodiment, the routine 230 determines a so-called "external" address, which is depicted in FIG. 1 as the appliance alias 160, by calculating a bit-AND with (224.0.0.0+ random(400)). In alternate embodiments, other calculations may be performed to determine a subnet address external from the subnet.

Using the appliance alias 160 IP address, the routine 230 in the appliance 110 sends an ICMP request to the ip_A 120a in step 615. A query 620 determines if an ARP request is generated by the ip_A 120a to the appliance alias 160. If the ip_A 120a issues an ARP request for the appliance alias 160, then the ip_A 120a does not know the subnet 180 mask on which it resides. Responsively, the routine 230 confesses in step 625 that "ip_A does not know the subnet mask," and the routine 230 returns control back to the main processor routine 200 (FIG. 2) in step 650. If there is no ARP request from the ip_A 120a, as determined by the query 620, then the process continues in step 630.

A loop is set up in step 630 to test a range of possible unused IP addresses. When the loop is complete (i.e., tested the possibly unused IP addresses), the routine 230 returns control back to the main processor routine 200 (FIG. 2). While the loop is not done, the loop performs processing for testing each of the candidate unused IP addresses.

First, a determination of several candidate subnet addresses based on ip_A is performed in step 635. The following lines of pseudocode are one embodiment of the method used to make this determination:

ip_X=ip_A;

ip_candidate_list<<ip_X-step;

ip_candidate_list<<ip_X+step;

random_step=random (0, RANGE-step);

ip_candidate_list<<ip_X+random_step+step+1;

ip_candidate_list<<ip_X-random_step-step-1;

where, << is defined to mean "insert" here.

After creating the candidate subnet address list in step 635, a second loop is set up in step 640 where a process loops once for each candidate subnet address. While the loop is not done, the loop performs a query 655, checking several conditions with regard to the candidate subnet address. The conditions may include: (i) is the candidate IP address (ip_Y) in the watched_ip_list 410 (FIG. 4), (ii) is ip_Y=IP_A, or (iii) is ip_Y=ip_router? If the query 655 answers "yes" to any of the three conditions listed, the process returns to the top of the loop 640. If the candidate IP address meets none of the conditions of query 655, then processing continues in step 660.

In step 660, an ICMP request is sent from the appliance 110, posing to be the candidate unused IP address, to the known IP address ip_A (e.g., computer 120a). If ip_A 120a issues an ARP request for the candidate subnet address, then ip_A 120a is unaware of a device that may have recently been operating with the candidate subnet address on the subnet 180. An example of such a case is a computer 120c that may temporarily be powered-down and ip_A 120a has since removed C3 120c from its list of device addresses. A query 705 is used to determine if ip_A 120a issues the ARP request. If an ARP request is not determined to have been issued by ip_A 120a, then processing returns to FIG. 6, point B, returning control back to the top of the loop 640. If an ARP request is determined to have been issued by ip_A 120a for the candidate subnet address in step 705, then processing continues in step 710.

In step 710, the candidate subnet address, ip_Y, is stored in an address list, once_seen_from_ip_A_list. The list, not shown, is merely a temporary storage for possible later usage. To verify that the candidate subnet address ip_Y is really unused, an ARP request is issued by the appliance 110, posing to be the central appliance server 150, for ip_Y. If there is an ARP reply from the candidate subnet address, as determined by query 720, then processing returns to the top of the loop 640 (FIG. 6). If there is no ARP reply from the candidate subnet address 115, ip_Y, then an ARP request from the appliance 110 for the candidate subnet IP address 115 is issued in step 725. If there is no ARP reply from ip_Y 115, as determined by query 730, in step 735, then the IP address associated with ip_Y 115 is assigned to a variable named ip_unused, or any other variable name used for such a purpose. After the assignment in step 735, control returns back to query 645 in FIG. 6.

If query 730 determines an ARP reply from the candidate IP address 115, then that is an indication that ip_Y 115 has already been assigned to another machine (for example, the router 130). In this case, the process would have caused an IP conflict in step 725, and immediate action to correct the IP conflict is performed. The reason immediate action needs to take place is because all subnet computers 120 will update an internal database storing knowledge of the router 130 and replace at least one entry in the database with the appliance 110 ether address, thereafter sending all inter-subnet communication packets 190 to the appliance 110, rather than to the router 130.

The immediate action provided by the find_unused_IP routine 230 is the following. First the routine 230 makes twenty so-called "helper" addresses based on the candidate address ip_Y in step 740. Next, the routine 230 sends an ICMP request from the helper addresses (note, the appliance 110 is actually performing the issuance of the ICMP requests) to the candidate address ip_Y 115 in step 745. In this case, however, the candidate address is (ether_Y, ip_Y), rather than all the previous addresses, (my_ether, ip_Y) which use the ether address of the appliance 110. Therefore, ip_Y, such as the router 130, may react to the ICMP request from (my_ether, the twenty addresses) to (ether_Y, ip_Y). In other words, because ip_Y does not know at least one of those twenty addresses, possibly, then it will seek to update its internal ether and IP address tables by issuing an ARP request for such information. All other devices, 110, 120, 130 update their internal ether and IP address tables with the information from within the ARP request, indicating the real router 130 ether and IP addresses. So, if an ARP request is seen, then the query 750 returns control back to the top of the loop 640 (FIG. 6). If no ARP request is seen, then query 750 proceeds to step 755.

As a fail-safe attempt to recover from an undesired IP conflict caused by the find_unused_IP routine 230, the routine 230 sends an ARP request via the appliance 110 posing as ip_Y, such as the router 130. Specifically, an ARP request is sent from (ether_Y, ip_Y), which are the router's 130 ether and IP addresses, for example. Resulting from this ARP in step 755 should be each subnet 180 device 110, 120, 130 updating their internal ether and IP address tables, thereby resolving the IP address conflict inadvertently created due to searching for an unassigned IP subnet address by the routine 230. Step 755 returns control back to the top of the loop 640 (FIG. 6).

Referring again to FIG. 6, once each candidate subnet IP address has been tested for whether or not each is unused, as determined by loop query 640, a query 645 is performed to determine if an unused IP address has been found. If an unused IP address has not been found, then processing continues in the outer loop, begun in step 630, where additional candidates subnet addresses based on ip_A 120a, determined in step 635, continues. If the unused IP address found query 645 is answered "yes", then the routine 230 returns control to the main processor routine 200 in step 650. Also, if the outer loop that started in step 630 is complete, then the process of routine 230 has not found an unused IP address and returns control back to the main processor routine 200 in step 650.

Referring again to FIG. 2, if the find_unused_IP routine 230 determines that ip_A does not know the subnet mask or an unused IP address is not found, then the main processor routine 200 ends in step 270. Otherwise, if an unused IP address has been found in the routine 230, then the next device IP address (and corresponding ether address) to locate is the router 130. Finding the router 130 is performed in a "find (ether_router, ip_router)" routine 240, also referred to as the find_router routine 240. Before discussing the details of the find_router routine 240, a brief, broad overview is discussed. First, the find_router routine 240 tries to use the ip_unused address determined from the find_unused_IP routine 230 to provoke some responses from the subnet 180 devices 120, 130. This step is done by ARP contacting many different IP addresses. Generally, routers are located at an IP address at the lower end of the subnet 130, where "lower end" means low number in the sequence of possible IP addresses dedicated to the subnet 180. Although the main processing routine 200, and subroutines contained therein, do not know the subnet 180 mask, each possible subnet mask based on ip_A 120a may be tried. In this way, many other ether addresses can be collected for further processing, where collection continues to occur in the tables 400 (FIG. 4).

Next, the find_router routine 240 tries to UDP-contact each possible ether address that has been collected so far in the tables 400 (FIG. 4). A UDP (User Datagram Protocol) packet allows for an entry in a field that indicates the TTL (time-to-live) to a device supporting this option/feature, such as a router. If a UDP packet with TTL=0 is sent to an IP-forwarding machine, that machine will respond with an ICMP time_exceeded reply immediately. That is how traceroute works. (An example of traceroute is, using a Web-based traceroute server, a user can trace the route through the Internet from the server to the user's own IP address. This is an invaluable aid to Internet connectivity troubleshooting, since it allows the user to check whether different parts of the Internet are using the expected route to the user's IP address.) Therefore, sending a UDP packet can be used to detect if one machine is a router or not. So, if one possible ether/mac address sends a reply to the UDP contact, then that is an indication that the reply was issued by the router 130. So, the appliance 110, via the find_router routine 240, gets the routers 130 IP and ether addresses from that reply message. If no device 120, 130 responds to the UDP contact with a reply, then the find_router routine 240 confesses "failed this time".

Figure 8:
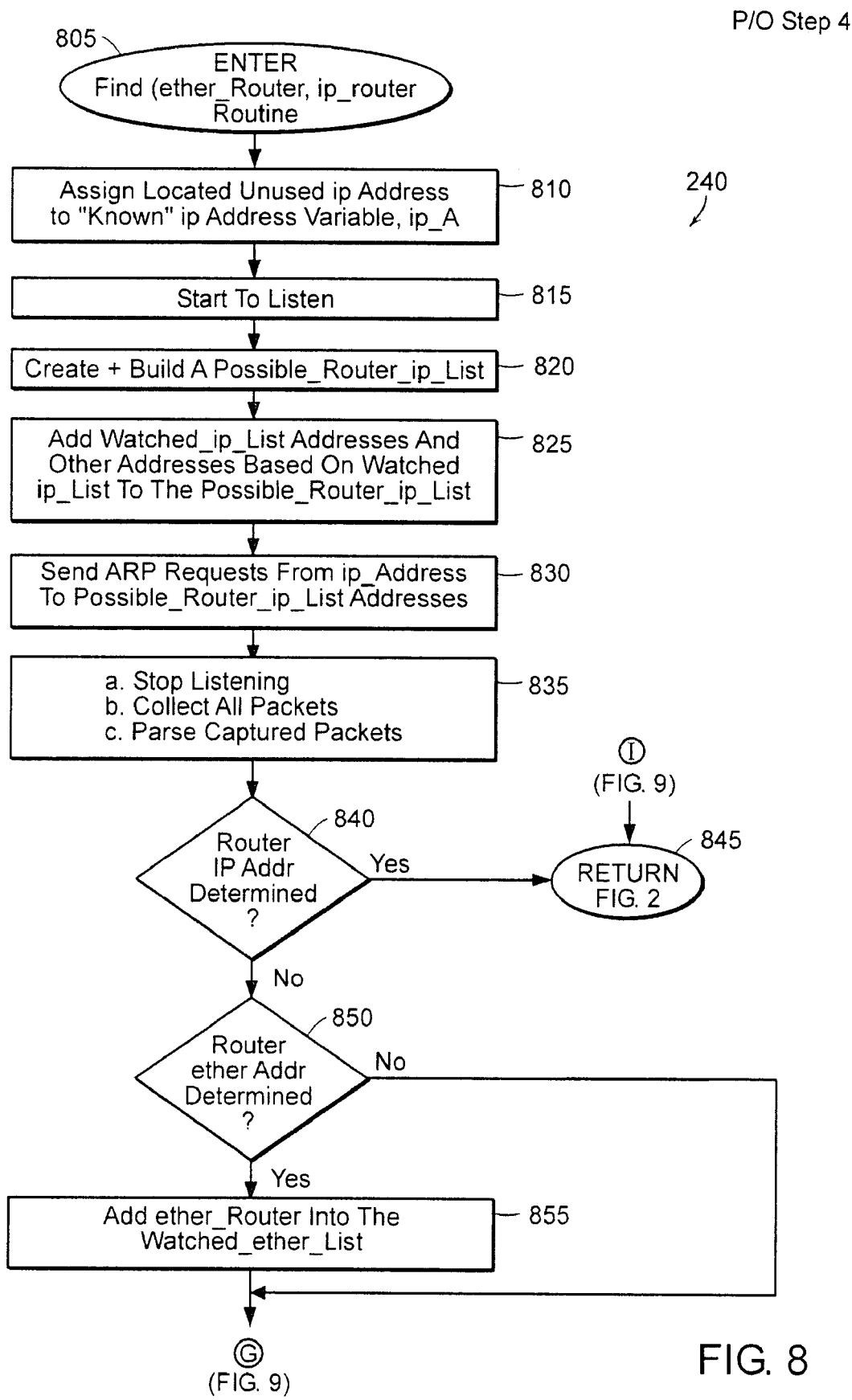
FIG. 8 is a first part of a flow diagram for a process of a fourth step of FIG. 2.
Figure 9:
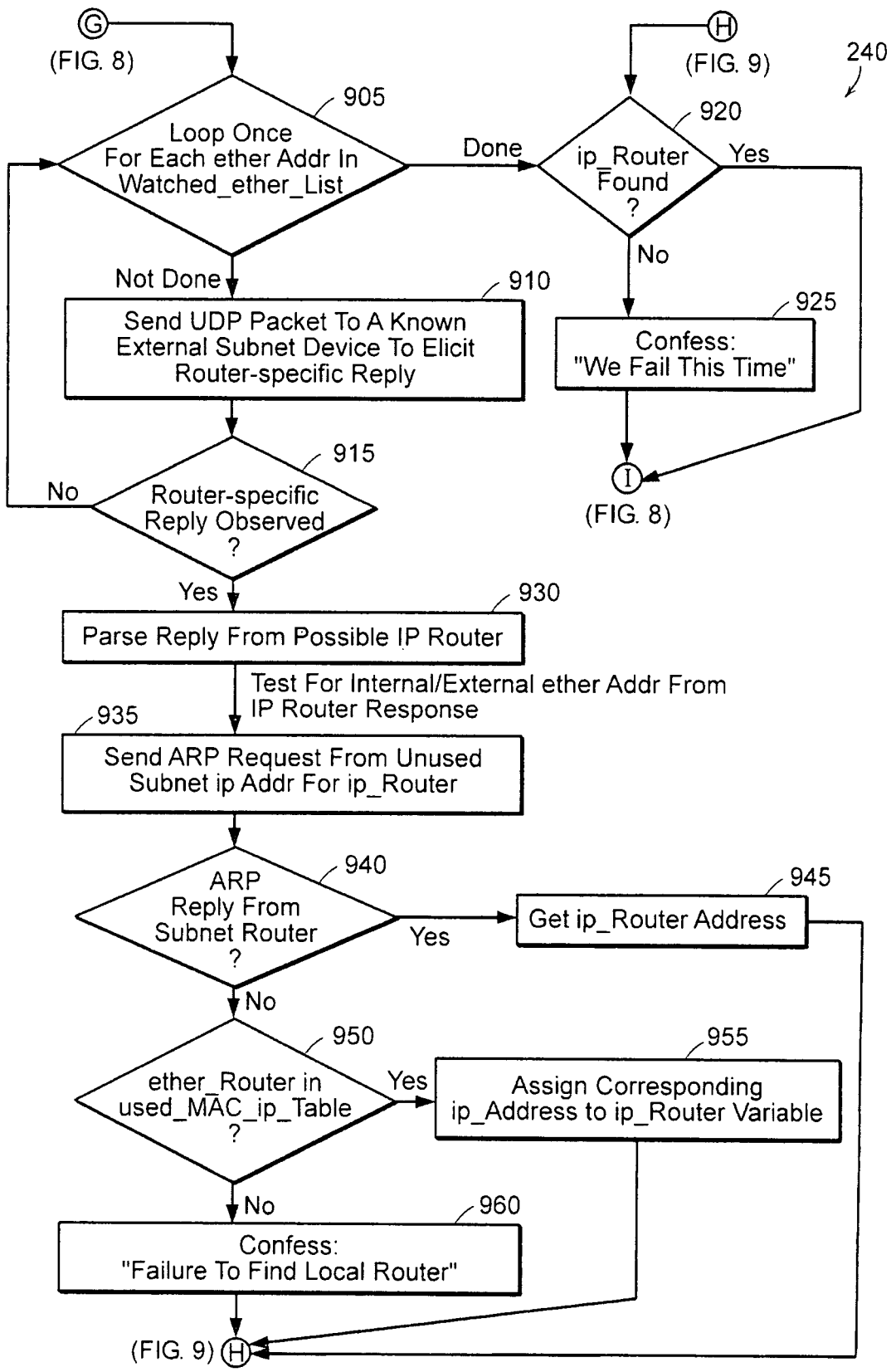
FIG. 9 is a second part of a flow diagram for the process of the fourth step of FIG. 2.

FIGS. 8 and 9 are flow diagrams of an embodiment of a process for the find_router routine 240. After entering the find_router routine 240 in step 805, which performs parameter receiving and local variable initialization, the located unused IP address is assigned to a "known" IP address variable, ip_A (for example, $C_1$ 120a) in step 810. Then, the find_router routine 240 starts to listen to the network for network packets 190 in step 815, similar to packet 190 collection in collect_packets routine 210 (FIG. 3).

A possible_router_ip_list is created and built in step 820. The following pseudocode provides one method for creating and building such a list.

```
netmask=255.255.255.255;

my % possible_router_ip_list;

for (i=0; i<20; i++) { netmask=netmask ^(1<<i);
```

```
    base_IP=ip_A & netmask;

for (j=0; j<20; j++)

possible_router_ip_list [base_IP+j]=1; # reduce
            redundancy }
```

The previous pseudocode builds a possible_router_ip_list (not shown) full of possible IP addresses located on 20 possible subnets, located at the low end IP address range in each of those possible subnets. The find_router routine 240 continues in step 825, where watched_ip_list 410 addresses, and other addresses based on watched_ip_list 410 addresses, are added to the possible_router_ip_list (not shown). The following pseudocode provides an example for performing step 825:

```
for IP (watched_ip_list) { put all [iP−5, iP+5] into possible_router_ip_list;

put 10 random IP addresses based on IP into possible_router_ip_list; }
```

Using the possible_router_ip_list IP addresses in step 830, the find_router routine 240 attempts to elicit information from other network devices 120, 130, and possibly devices located in or on the network 140 for additional network IP and ether address information. Specifically, step 830 sends ARP requests from (ether_A, ip_A) for the IP addresses stored in the possible_router_ip_lists. In other words, ARP requests are sent from the appliance 110, which assumed the IP address identified in the find_unused_IP routine 230, and its own ether address (i.e., ether_A=my_ether) for the various possible routers. Here, the term elicit means to send requests in order to have one or more devices 120, 130, etc., return either a request or a response responsively, preferably a deterministic ARP request.

In step 835, the find_router routine 240 performs three steps. First, the routine 240 stops listening. Second, the routine 240 collects all packets 190, or information contained therein, which is stripped out for efficiency reasons. Third, the captured packets 190 are parsed for relevant potential router 130 address information. Again, because routers are generally assigned low numbered IP addresses in a subnet 180, it is expected that the router 130 will have replied to the ARP requests of step 830.

At this point, it is possible at this point that the IP address of the router 190 has been determined by the find_router routine 240, therefore, the determination query 840 checks if the router IP address has been determined. If the answer to the IP address determined query 840 is "yes", then, in step 845, control is returned to the main processor routine 200 (FIG. 2) with the router ether and IP address information. If the router IP address determined query 840 has answered "no", then a router ether address determined query 850 is performed.

If the router ether address determined query 850 is answered "no", then process continues in FIG. 9, at point G. If the query 850 is answered "yes", then the ether address of the router 130 is put into the watched_ether_list 420 (FIG. 4) in step 855. Following step 855, the process continues at point G (FIG. 9).

FIG. 9 continues with the process of the find_router routine 240 begun in FIG. 8. Point G is the entry point from FIG. 8. If the process reaches this point, then the IP address of the router 130 has yet to be determined. To begin the determination process for the router 130 IP address, a loop is set up for testing each ether address in the watched_ether_list 420 (FIG. 4) in step 905. If the loop is not done, then step 910 is performed. Step 910 sends a UDP packet from (my_ether, ip_unused), (note, my_ether is the ether address of the appliance 110), to the central appliance server 150. But, rather than using the CAS 150 ether address, one at a time, the ether addresses stored in the watched_ether_list 420 (FIG. 4) are used, the UDP therefore taking on the form of (watched_ether, ip_CAS). The UDP packet provides a means for eliciting (or generating) a router-specific response. The UDP packet is issued by the appliance 110 with a TTL (time-to-live) parameter set to a value so small (e.g., zero) so that the router cannot possibly send and receive a response in the parameter time resulting from the UDP packet, forcing the router to tell the sending address (i.e., the appliance 110) that the packet is "too old."

If a router-specific reply is not observed, as determined by the router-specific reply observed query 915, then the loop 905 continues, using the next ether address in the watched_ether_list 420 (FIG. 4). If a router-specific reply is observed, as determined by query 915, then the reply from the possible IP router is parsed in step 930. Note that the router-specific reply is typically an ICMP time exceeded reply. Also, the reply is expected to be from (watched_ether, ip_router).

Next, the find_router routine 240 performs a test to determine whether the router-specific reply was returned from the subnet-side IP address or the network-side (i.e., public) IP address. To perform this test, an ARP request is sent from the appliance 110 as (my_ether, ip_unused) for the ip_router in step 935.

If the appliance 110 sees an ARP reply from the asked IP address, as determined by query 940, then in step 945, the ip_router address is parsed out of the reply and used later in the main processor routine 200 (FIG. 2). If the query 940 does not see the ARP reply from the asked IP address, then, if the find_router routine 240 in step 950 finds the ether_router in the used_mac_ip_table 440 (FIG. 4), the corresponding IP address is taken from the used_mac_ip_table 440 and assigned to a corresponding ip_router variable in step 955 for future processing. If the ether_router is not found by query 950 (and inherent search of the used_mac_ip_table 440), then, in step 960, a confession is made indicating the find_router routine 240 has "failed to find the local router." Note that this and other such confessions are issued to an interface, possibly machine-to-human or machine-to-machine, or both.

Whether the processing steps of 940 or 950 have located the IP address of the router or not, processing continues at point H, leading to the ip_router found query 920. If the ip_router has not been found, then another confession of failure is admitted in step 925 and processing continues at point I (FIG. 8). This confession in step 925 is performed for the case of the loop 905 finishing without the router 130 having been found by the find_router routine 240. If the ip_router has been found, as determined by query 920, then processing also continues in FIG. 8 at point I.

Referring again to FIG. 8, point I leads directly to step 845, where control is returned to the main processor routine 200 (FIG. 2).

Referring again to FIG. 2, if the find_router routine 240 fails to find the router 130, then the main processor routine 200 exits in step 270. Otherwise, the main processor routine 200, following the find_router routine 240, executes a find_subnet_mask routine 250, which tries to figure out the subnet 180 mask. Though knowledge of the subnet (not shown) is not required for accessing the WAN 140, isolating the subnet mask may produce additional network 100 information for the appliance 110.

In general, the find_subnet_mask routine 250 performs the following process. First, the routine 250 assumes that the 32-bit subnet mask is regular, which is all ones and then all zeros (i.e., 111.100.0). Second, the find_subnet_mask routine 250 tries to find the boundary between the ones and zeros. Also, the routine 250 assumes, in one embodiment, that each subnet 180 to which the appliance 110 is coupled is greater than 224.0.0.0 and less than or equal to 255.255.255.252. Third, the routine 250 starts to search, using a binary search technique or other search technique that accomplishes the same result, for the boundary between the subnet mask ones and zeros. For each bit tested that is on the boundary between the ones and zeros of the subnet mask, that bit of ip_A is XOR'd to get another IP address. Fourth, the routine 250 uses the calculated IP address to ICMP contact ip_A. If there is an ARP request from ip_A, the routine 250 confirms that the subnet mask bit being tested should be a "0". Otherwise, that bit is determined to be a "1". In this way, the routine 250 figures out the boundary quite fast.

Figure 15:
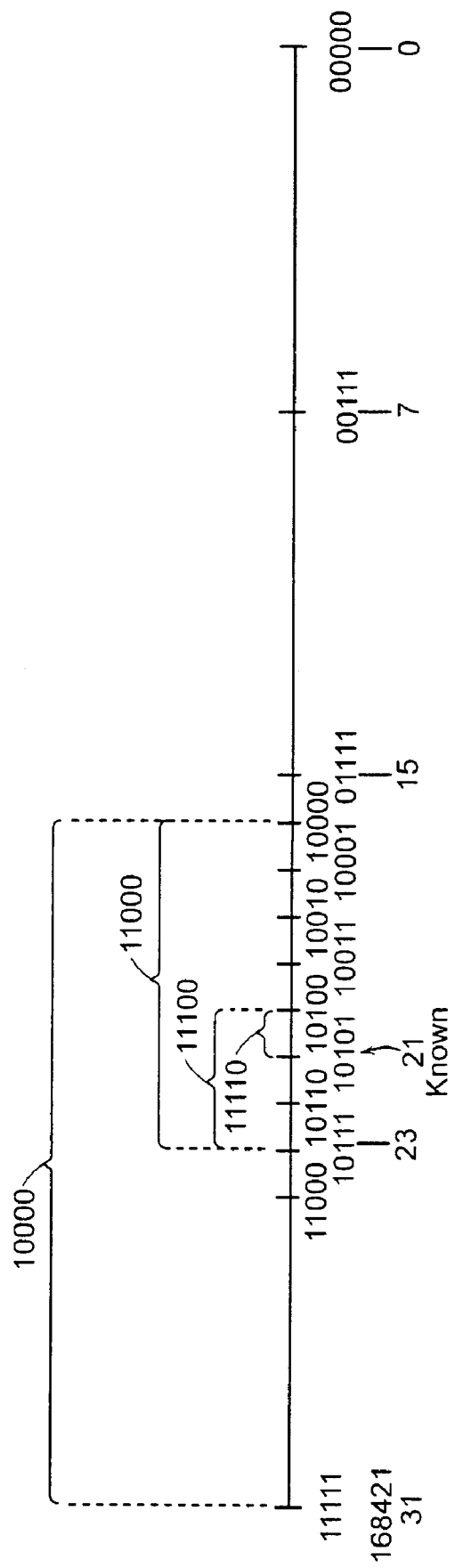
FIG. 15 is a 5-bit linear scale related to the process of determining a subnet mask depicted in FIGS. 10-12.

FIG. 15 is a 5-bit linear scale illustrating the relationship between a 5-bit subnet mask and 5-bit subnet addresses. A subnet mask indicates which bits are shared by all nodes in a subnet. Subnet masks are typically viewed in hexadecimal or binary forms. Viewed in binary form, the subnet mask directly indicates all address bits that must match in a packet address such that a network node employing the network mask considers the address to be associated with the subnet. For subnet mask bit positions having a '1', corresponding bits in the address are relevant to a determination of whether an address is within the subset's range of addresses. For all subnet mask bit positions having a '0', all corresponding bits in the address are inconsequential to a determination of whether an address is within the subset's range of addresses.

Four subnet masks are provided above the scale: '10000', '11000', '11100', and '11110'. As indicated, the range of addresses corresponding to each subnet mask varies inversely with the number of '1's in the subnet mask. For example, subnet mask '10000' has the widest range of matching addresses; subnet mask '11110' has the narrowest range of matching addresses.

A node will only respond to certain commands which originate within its subnet. In accordance with the invention, a subnet mask is found by determining a source from which a packet can evoke a response from a subnet node. From each side of possible transient points defined by different masks, the node makes a number of communications to a known, local, subnet node. Several possible subnet masks may have to be tried to find the correct one for the local subnet.

Different packet types—ARPs and ICMPs—may be used to evoke a response from nodes also on the local subnet. Even if the source is on the same subnet as the known node, a response to those packets is only evoked if the source is unknown to the known node. To ensure that at least one source address is unknown, random source addresses within the possible subnet regions are used. It is assumed that one of the random sources is not known to the nodes on the subnet, so that at least one of the nodes issues a response to learn the source of the unknown address(es).

For example, still referring to FIG. 15, let the subnet span from positions 23 to 20 and employ a subnet mask '11100'. Let the node located at the known address be located at position 21. ARP packets issued from unknown addresses in the region covered by subnet mask '11110' to the known node evoke ARP requests. ARP packets issued from unknown addresses in the region covered by subnet mask '11100' to the known node also evoke ARP requests. So, no deterministic information about the subnet mask transition point is learned from communications from addresses within these two subnet mask address ranges since both sets evoke responses. However, ARP packets issued from just outside the subnet mask '11100' subnet region (e.g., position 19) do not evoke responses from the known node. The subnet mask may be determined by finding the bit at which responses are evoked from an address having the bit in one binary state and not the other binary state, which supports communications from just within the subnet mask transition point and not from just outside the transition point. Since no response is evoked from addresses '110xx', '100xx', or '0xxxx' (where x's are "Don't Care's", the process determines the third bit in the subnet mask to be the transition point; hence, subnet mask '11100' is determined.

As a different example, the following table provides a 10-bit binary representation of subnet addresses and the subnet masks to further illustrate the process of determining the subnet mask.

| known address | 0110001011 |
| subnet mask to be determined | 1111100000 |
| response addresses | 01100xxxxx |
| (a) if send packet from | 0100001011 |
| (b) and send packet from | 0111001011 | no difference is expected in responses (i.e., neither (a) nor (b) is expected to cause a response);

| (c) it send packet from | 0110101011 |
| (d) and send packet from | 0110011011 | a difference is expected in responses (i.e., (c) is not expected to cause a response; (d) is expected to cause a response);

| (e) if send packet from | 0110000011 |
| (f) and send packet from | 0110001111 | no difference is expected in responses (i.e., both (e) and (f) are expected to cause a response);

So, one embodiment of the process for determining a subnet mask may be outlined as follows. Assume a possible subnet mask. At the transition point of the subnet mask, change the corresponding bit in the known address. Use this modified known address for a base address, selecting plural addresses within the address space of the base address. Issue network packets intended to evoke responses from the known and possibly other subnet addresses. Extend the subnet mask to the right by one position and repeat. This method searches for evoked responses from just within and not from just outside the subnet mask address space. In other words, if a response is detected from packets from one set of addresses and not from the other, the node determining the subnet mask has isolated the number of 1's in the subnet mask. If the subnet mask is not isolated, then based on whether no responses are detected or at least two responses are detected, adjust the transition point of the possible subnet mask. Optionally, apply a binary search technique to expedite the search until all possible subnet masks have been exhausted.

Figure 10:
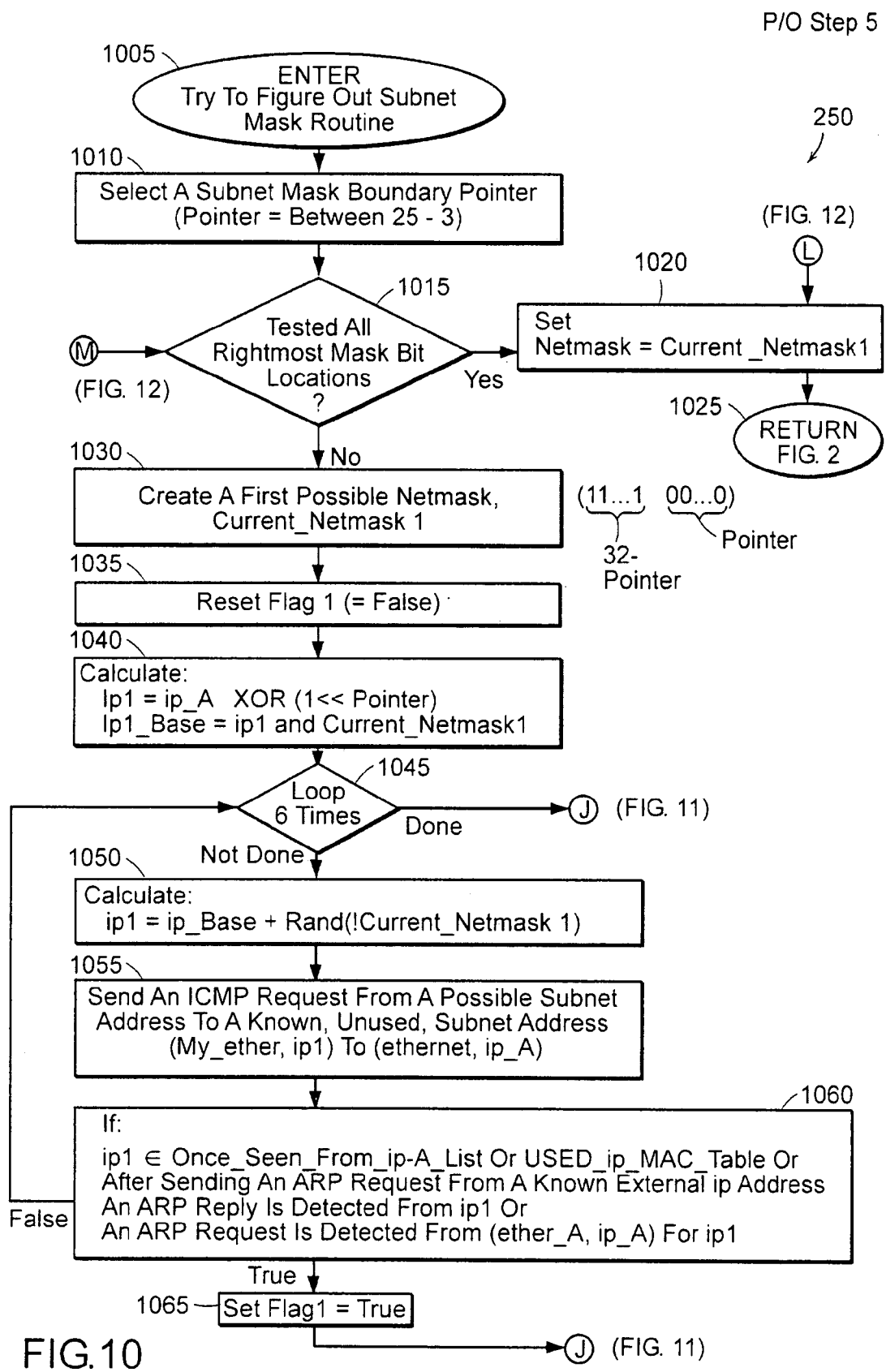
FIG. 10 is a first part of a flow diagram of the process of a fifth step of the flow diagram in FIG. 2.
Figure 11:
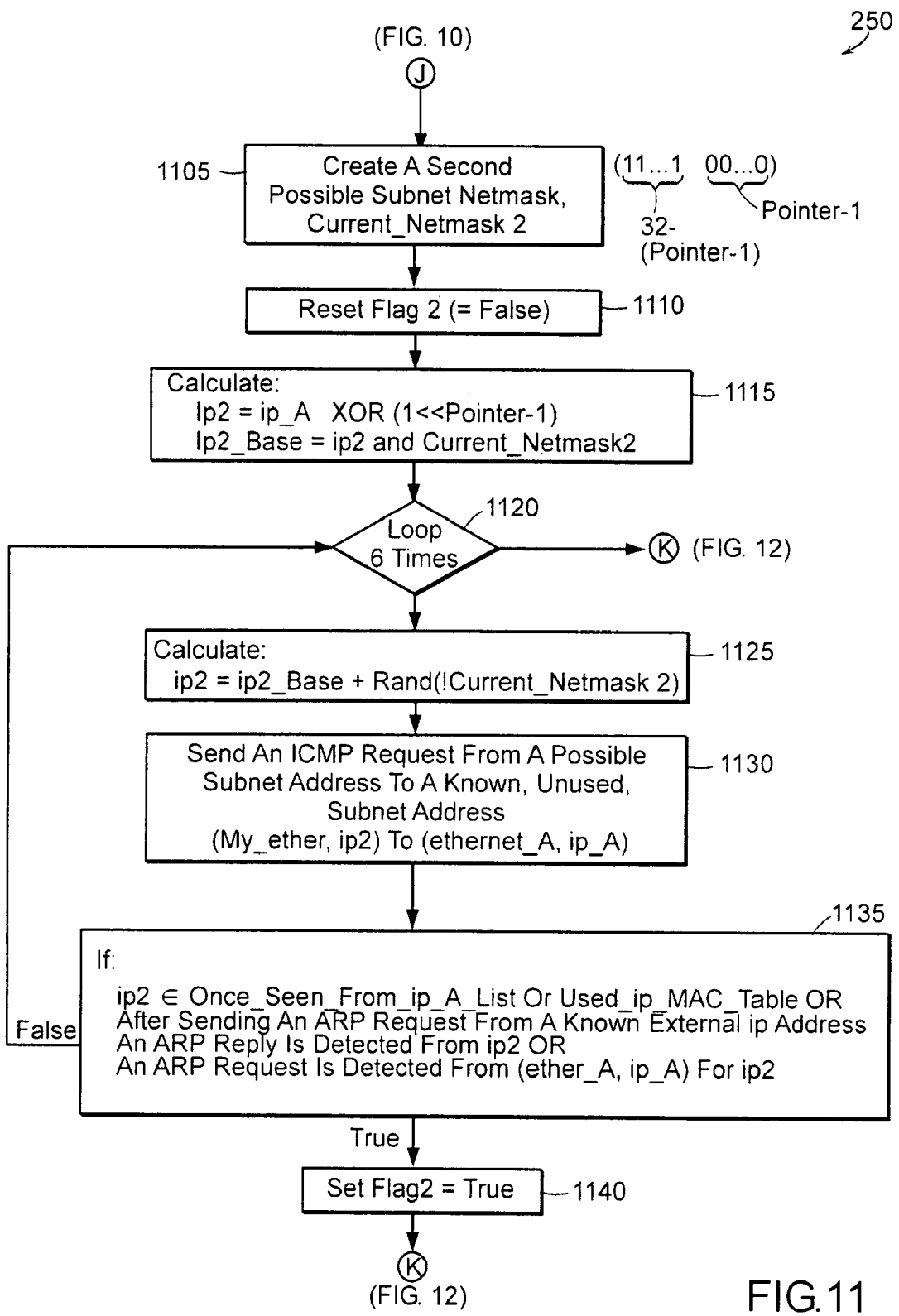
FIG. 11 is a second step of a flow diagram for the process of the fifth step of FIG. 2.
Figure 12:
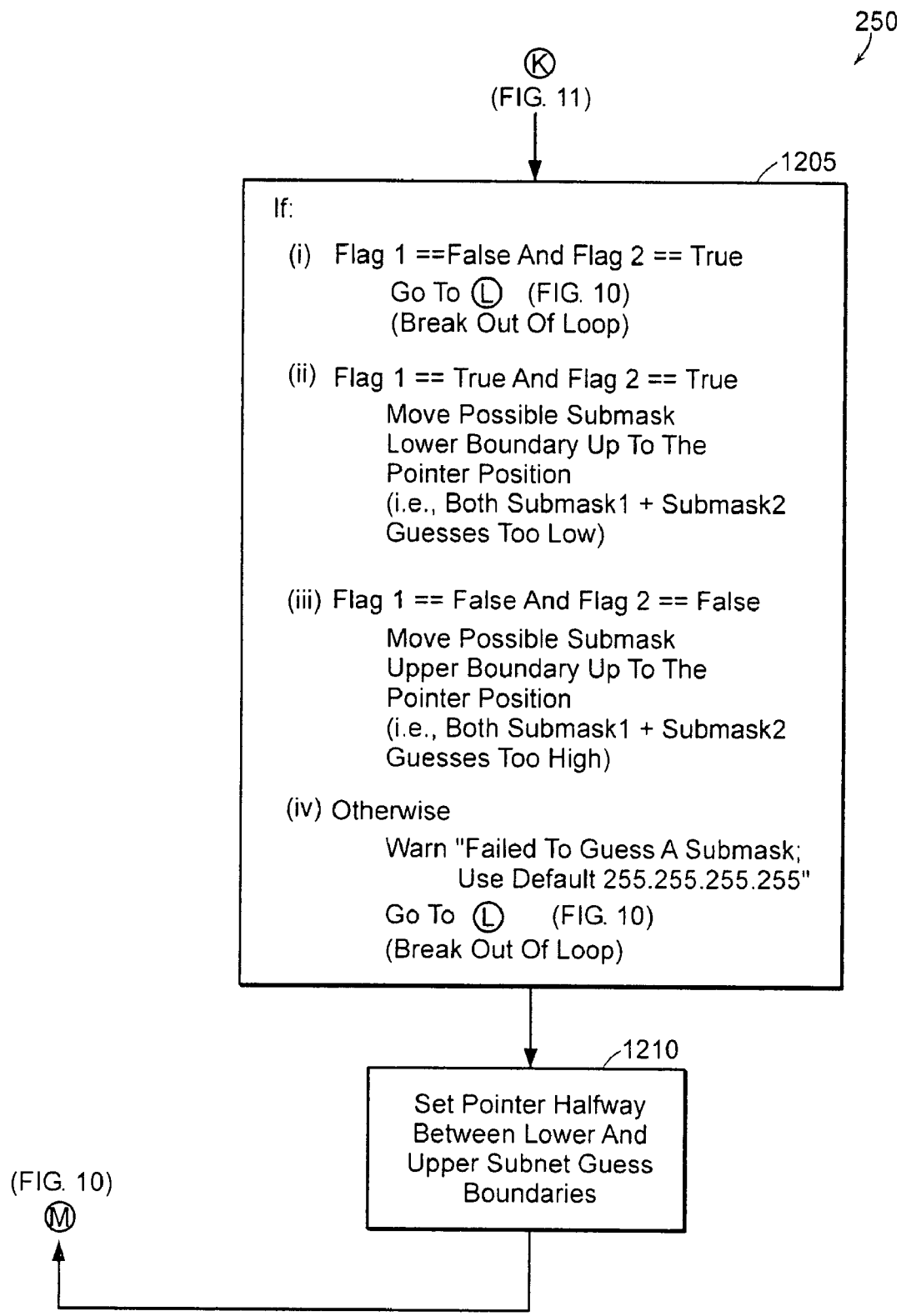
FIG. 12 is a third step of a flow diagram for the process of the fifth step of FIG. 2.

FIGS. 10-12 provide a flow diagram of an embodiment of a process used by the find_subnet_mask routine 250. The flow diagram provides details for the general description just provided.

Referring to FIG. 10, the find_subnet_mask routine 250 initializes variables and passes parameters in step 1005. Next, a subnet mask boundary pointer is selected. In one embodiment, the boundary pointer is randomly selected between the values 25 and 3, inclusively. In this embodiment, the pointer is a value to select a position in the 32-bit binary subnet mask. It is assumed that the subnet mask corresponding to the subnet 180 on which the appliance 110 resides is between the subnet mask values described above, namely greater than 224.0.0.0 and less than or equal to 255.255.255.252. Testing continues until all possible rightmost mask bit locations have been tried, as determined by the query 1015. Here, rightmost mask bit locations means all possible boundary positions between 25 and 3 at which the submask ones end and submask zeros begin.

If all rightmost mask bit locations have not been tested, then the find_subnet_mask routine 250 continues searching for the subnet mask in step 1030.

In step 1030, a first possible subnet mask, current_netmask1, is created. Current_netmask1 is defined as a 32-bit number having all ones to the left of and up to the pointer value and all zeros to the right of the pointer value. An example pseudocode statement for creating such a subnet mask is:

current_netmask1=create_netmask(pointer), where create_netmask(pointer) is a function(parameter) which creates the 32-bit number representing the possible subnet mask. For current_netmask1, the result of create_netmask(pointer) is a 32-bit binary string that has thirty-two minus pointer 1's on the left side of the binary string and pointer zeros on the right side of the binary string. For current_netmask2, the result of create_netmask(pointer −1) is a 32-bit binary string that has thirty-two minus (pointer minus one) 1's on the left side of the binary string and (pointer minus one) zeros on the right side of the binary string.

To keep track of whether or not the subnet mask has been determined, two flags are used by the find_subnet_mask routine 250, namely flag1 and flag2. Flag1 reflects if Current_netmask1 is bigger than the real subnet mask, and flag2 reflects if Current_netmask2, discussed below, is bigger than the real subnet mask. In step 1035, flag1 is reset (i.e., set equal to Boolean-false). Next, calculations are made to set other variables used in the determination process, namely ip1 and ip1_base. These calculations are determined in step 1040. The calculations are listed in the following pseudocode:

$ip1 = ip\_A \char`\^ (1 << pointer);$ $ip1\_base = ip1 \ \& \ current\_netmask1;$ where the ^ indicates an operation that performs an XOR function, the << indicates an operation that performs a left shift of the number 1 "pointer" number of times, and the "&" indicates to perform a Boolean-AND function on the operands.

Once the variables have been created in the preceding steps of the find_subnet_mask routine 250, a loop is employed to help determine if the randomly selected boundary pointer is indeed set in the correct subnet mask boundary position. The loop begins in step 1045, where the loop counter is initialized to a value of six. Note that in alternate embodiments, the loop may be performed fewer or more times. The first step in the loop 1050 calculates a variable, ip1, according to the following equation:

$ip1 = ip\_base + rand \ (!current\_netmask1)$

This statement produces a possible IP address at a base IP address which defines the inside edge of the subnet mask, plus some random address within the possible subnet mask determined above. The variable, ip1, calculated in step 1050 is used by the appliance 110 in step 1055 to send out an ICMP request. The ICMP request from the appliance 110 appears to be from a possible subnet address to a known, used, subnet address. Such a statement may be of the form of the pseudocode:

send ICMP request from (my_ether, ip1) to (ether_A, ip_A), where my_ether is the ether address for the appliance 110, ip1 is calculated in step 1050, ether_A is the ether address of a known node on the same subnet, and ether_A and ip_A are the determined ETHER and IP addresses, respectively, of the node found in the get_ip_A routine 220. Note that if an ICMP request is sent out locally (i.e., on the ethernet 125 in the subnet 180) and the destination node 120a does not have the required entry in its ARP table, then the destination computer 120a will ARP-respond to learn the ethernet address of the sending device. It is from these ARP responses that a determination is made as to whether the pointer has been assigned the correct subnet mask pointer position.

The correct pointer position determination is made in step 1060. An IF statement in step 1060 includes several conditions, any one of which determines process flow because of the OR statements separating each of the three conditions. The first condition is:

Is ip1 is an element of (∈) once_seen_from_ip_A_list (step 710, FIG. 7) or used_ip_mac_table 430?

The second condition is:

After sending an ARP request, from the appliance 110 posing as an external device, e.g., (my_ether, ip_CAS), the central appliance server 150, was an ARP reply detected from (ether, ip1)?

The third condition is:

Has an ARP request been detected from (ether_A, ip_A) for ip1?

If none of the three conditions is satisfied, then the loop continues from step 1045. If one or more of the three conditions is satisfied in step 1060, then processing continues in step 1065, where the flag1 variable is set to a Boolean-true value. Setting the flag1 to a Boolean-true value indicates that the subnet mask guess address value, based upon the upper boundary pointer value, is less than or equal to the real subnet mask address value, since a local subnet 180 response is seen or the ip1 address was previously determined to be on the subnet 180. Processing continues at point J in FIG. 11 after step 1065 and after looping through the loop of 1045 six times without a positive result.

In FIG. 11, point J begins the continued process of the find_subnet_mask routine 250 begun in FIG. 10. For brevity, all steps depicted in FIG. 11 parallel for a second set of variables and subnet masks, etc., the process depicted and described in FIG. 10 beginning at step 1030. Differences may be determined empirically. The process of FIG. 11 tests the subnet mask having one more "1" bit than the process beginning in step 1030 of FIG. 10. This is indicated in step 1115, wherein the left shift step is performed for "pointer −1". The process of FIG. 11 proceeds to point K in FIG. 12.

FIG. 12 includes a last part of the find_subnet_mask routine 250 process. Point K leads into step 1205. Step 1205 is effectively an IF/ELSE IF/ELSE statement. Logic controlling the flow of the IF statement of step 1205 is based upon the Boolean values of flag1 and flag2, as determined in the process steps of FIGS. 10 and 11, as previously discussed.

Condition (i) tests if flag1==false and flag2==true. This condition means that the subnet having one bit to the right of the pointer is determined to be the correct subnet mask for the subnet 180. If condition (i) is true, the subnet 180 has been determined, and the loop beginning in step 1015 (FIG. 10) is exited by a jump to point L (FIG. 10).

The second case, a first ELSE IF statement in step 1205, tests whether both flag1 and flag2 have been set to Boolean-true. This means that both subnet masks, one bit above and one bit below the current pointer position, include IP addresses which are located inside the subnet 180. In this case, the lower boundary is moved up to the pointer position and processing continues, working within the upper boundary and the newly moved lower boundary.

The third case, a second ELSE IF statement in step 1205, tests whether both flag1 and flag2 have been set to Boolean-false. This means that the pointer is set too high such that no device 120, 130 in the subnet 180 will ARP respond, nor will any device 120, 130 in the subnet 180 have been determined to be in the subnet 180 from past data packet 190 capture steps in the processing routine 200 (FIG. 2). Therefore, the possible submask upper boundary is moved down to the pointer position.

The last condition, an ELSE statement in step 1205, covers a case where the submask has not been found and there are no conditions above which satisfy the state of the flag1 and flag2 variables. Therefore, a warning, "failed to guess a subnet mask," is presented to the user, transmitted to an interface, or used by other processes in the processing routine 200 (FIG. 2). This case again breaks out of the loop started in step 1015 (FIG. 10), jumping to point L in FIG. 10.

If the ELSE IF condition is step 1205 is Boolean-true, then step 1210 is performed. In step 1210, the pointer is set halfway between the lower and upper subnet guess boundaries. This is part of the binary search procedure used by the find_subnet_mask routine 250. Following step 1210, the process returns to point M (FIG. 10), where the "tested all rightmost mask bit locations" query 1015 is performed. If all rightmost mask bit locations have been tested, as determined by query 1015, then the last subnet mask position is used as the net mask in step 1020. Processing control returns to the main processor routine 200 (FIG. 2) in step 1025.

Referring again to FIG. 2, if the find_subnet_mask routine 250 fails to guess a subnet mask, then a default subnet mask, 255.255.255.255 is used, and the main processor routine 200 exits in step 270. Otherwise, after trying to figure out the subnet mask in the find_subnet_mask routine 250, a final check is performed to ensure an unused IP address has been determined in the subnet 180. A "final conflict check" routine 260 is used to test the candidate unused IP address that will be temporarily assigned to the appliance 110.

Figure 13:
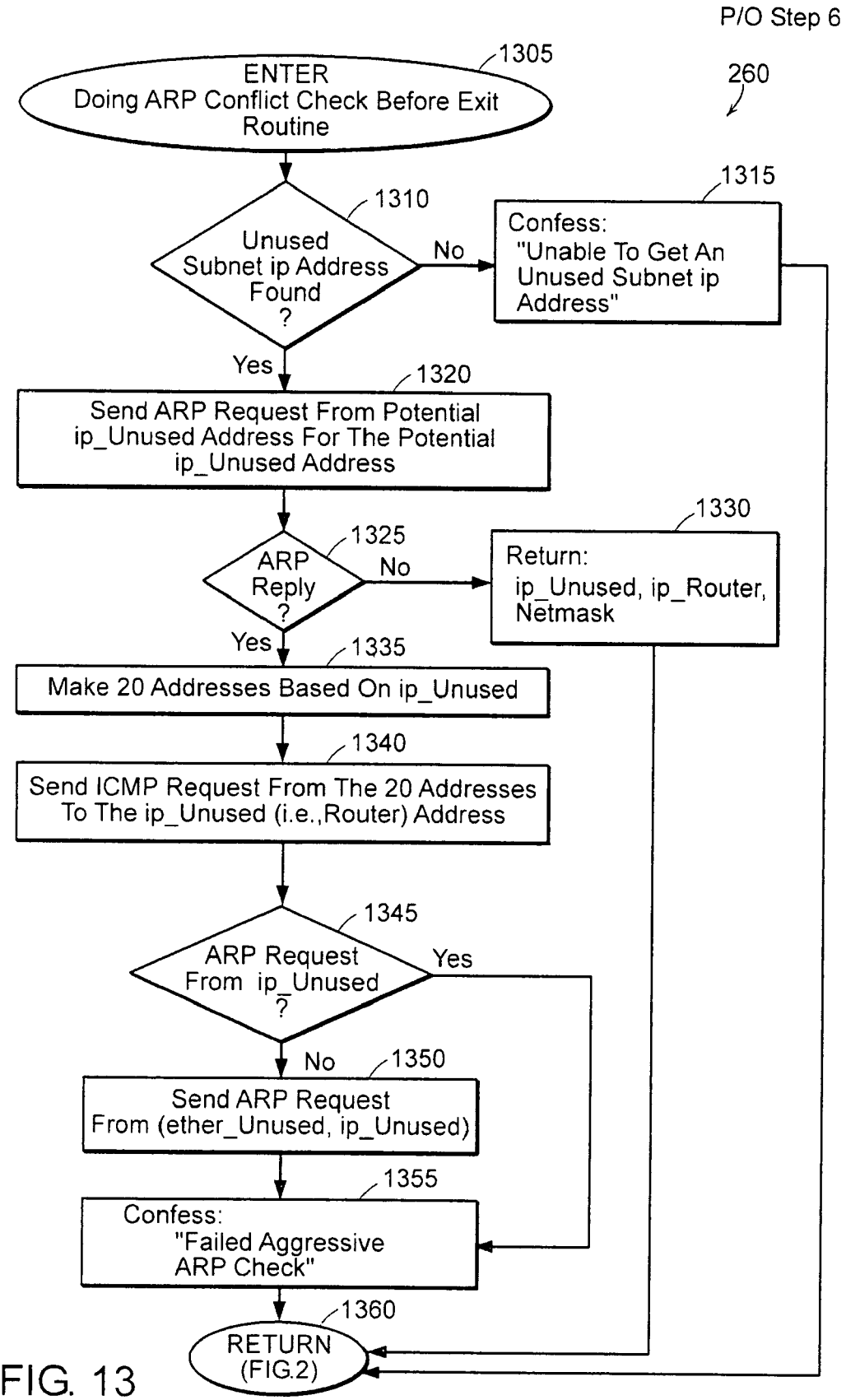
FIG. 13 is a flow diagram for the process of the sixth step of a sixth step of FIG. 2.

FIG. 13 is a flow diagram of a process of the final_conflict_check routine 260. Variables are initialized and parameters are passed in step 1305. A check to determine if an unused subnet IP address is found is performed in query 1310. If query 1310 is answered "no," then, in step 1315, the final_conflict_check routine 260 makes a confession is made that the appliance 110 is "unable to get an unused subnet IP address." Following 1315, control is returned back to the main processing routine 200 (FIG. 2) in step 1360.

If an unused subnet IP address is determined to be found by query 1310, then an aggressive check is performed to ensure that that IP address is really unused. The following steps, beginning with step 1320, perform very similar actions to the processing steps in FIG. 7, beginning at step 725. Still referring to FIG. 13, in step 1320, an ARP request is sent from the potentially unused ip_unused address (from the appliance 110 posing to be the ip_unused address device 115) for the potential ip_unused address. If there is no ARP reply, determined by query 1325, then the final_conflict_check routine 260 returns parameters ip_unused, ip_router, and subnet mask. So, if these parameters are valid values (i.e., ip_unused and ip_router are not zero), then the process of automatically finding a subnet address on the local subnet is complete. Otherwise, the process of finding an available subnet address may be retried again after some period of time, beginning in the main processor routine 200 (FIG. 2).

Because the router 130 address has been determined, the appliance 110 is able to issue packets 190 of request or other information to the router 130, which, in turn, transmits those packets 190 from the router 130 through the network 140 to the central appliance server 150. Furthermore, the central appliance server 150, having received the appliance 110 data packets 190, is able to return packets 190 of data from the internal registry 155 in the central appliance server 150 back through the network 140 to the router 130, which, in turn, issues the data packets 190 to the appliance 110. Either way, the packet 190 fetched from the registry 155 in the central appliance server 150 includes an IP address (for the appliance 110 to use on the subnet 180) which is free of conflict of other devices 120, 130 on the subnet 180, since the returned IP address included in the configuration information from the CAS 150 is expected to be unique for the subnet 180. In one embodiment, the IP addresses stored in the registry 155 are updated as subnet 180 IP address information becomes available to avoid later IP conflict. In another embodiment, the CAS 150 may include security information or redirect the contacting appliance 110 to another authoritative CAS. Following step 1330, control is returned back to the main processing routine 200 (FIG. 2) in step 1360.

If the ARP reply query 1325 is answered "yes", then the IP conflict procedure, discussed in steps 740 through 755 (FIG. 7) is used to recover from the IP conflict. Step 1355 confesses that, in the event of the IP conflict, the final_conflict_check routine 260 has "failed aggressive ARP check." Step 1360 then returns control back to the main processing routine 200 (FIG. 2).

Referring again to FIG. 2, if the final_conflict_check routine 260 is (i) unable to get an unused subnet IP address or (ii) determines a failure of the aggressive ARP check, then the main processor routine 200 exits in step 270. Otherwise, after performing the final_conflict_check routine 260, the main processing routine 200 exits in step 270. At this point, the appliance 110 knows a subset or all of the other devices 120, 130 on the subnet 180, both ethernet and IP address information. The appliance 110 knows how to communicate with the central appliance server 150 through the router 130 and network 140. The central appliance server 150 knows how to send packets 190 of information to the appliance 110. The appliance 110 now has a permanent configuration, which includes a permanent IP address and ethernet address. One reason for assigning a permanent IP address rather than simply using the locally, unused, IP address is to avoid a circumstance where, for example, $C_2$ 120b is temporarily powered down. Later, when $C_2$ 120b is powered up, an unintentional IP conflict would be created since, in this example, both the appliance 110 and $C_2$ 120b would occupy the same IP address on the subnet 180. Should the permanent IP address turn out to be used by another subnet device due to the situation just described, the appliance 110 corrects the conflict, reports the conflict to the CAS 150 for later reference, and receives a new, permanent, IP address. This process is not shown, but may be understood from the teachings above.

Figure 14:
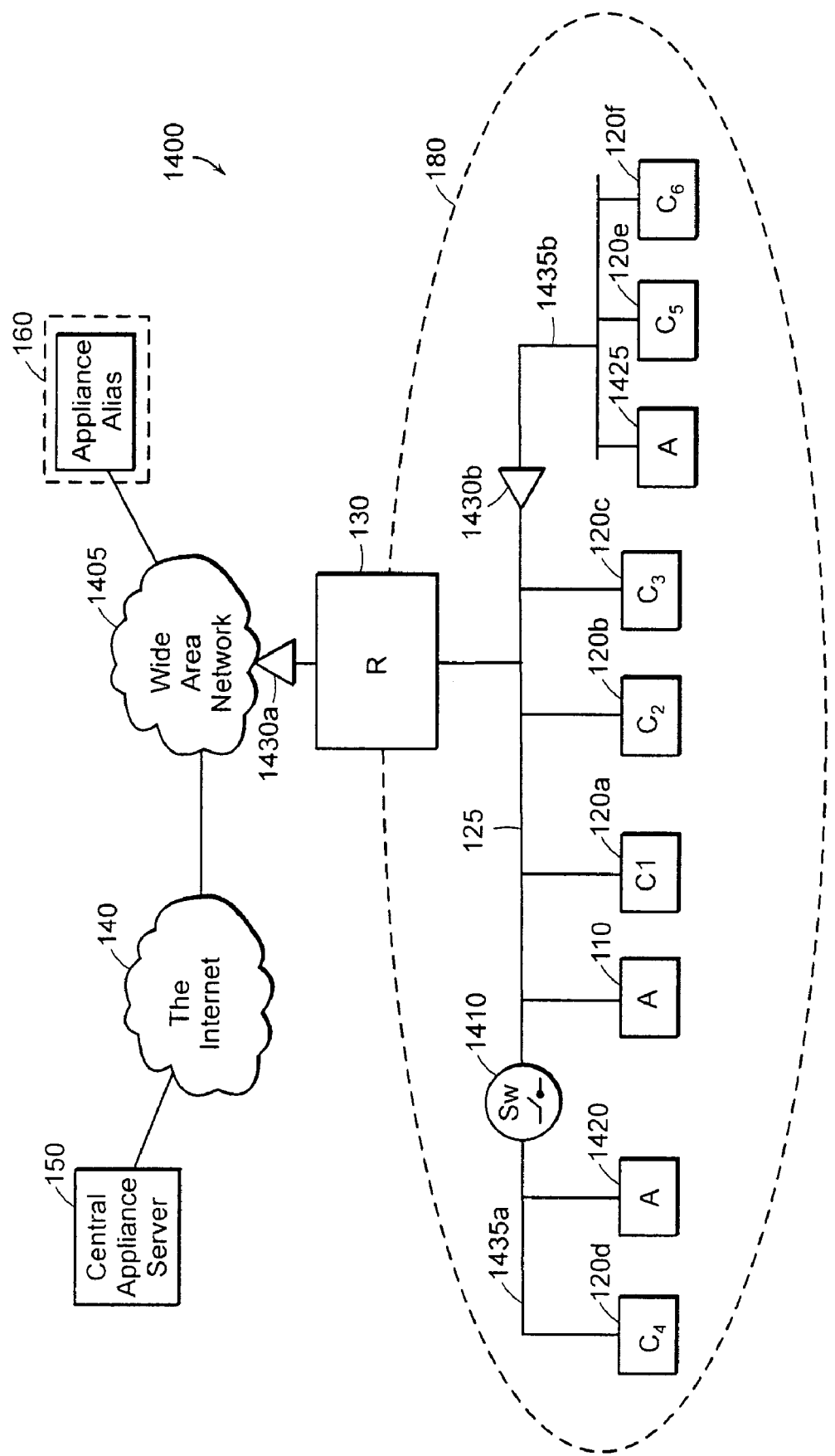
FIG. 14 is a block diagram of a complex network in which the present invention may be deployed.

FIG. 14 is a block diagram of a network 1400 that is more complex than the more simple network shown and described in reference to FIG. 1. The core network elements from the network 100 (FIG. 1) are included in the network 1400 of FIG. 14. In the network 1400, there is the central appliance server 150, the network or internet 140, the subnet 180 having a subnet router 130, appliance 110 and computers 120, and ethernet 125. Additional elements in the network 1400 include a wide area network 1405, proxies, network address translation (NAT) devices/routers, or firewalls 1430a, 1430b, network switch 1410, ethernets 1435a, 1435b, computers 120d, 120e, 120f, and additional appliances 1420, 1425.

The principles of the present invention are capable of operating and automatically assigning IP addresses to each appliance 110, 1420, 1425, even in the face of the network switch 1410 and proxy/NATS 1430a, 1430b. In the case of the proxy/NATS 1430a, 1430b, the central appliance server 150 uses information determined by a process to overcome network address translation systems, as described in U.S. Provisional Patent Application Ser. No. 60/260,535 filed Oct. 20, 1999 entitled "Automatic Network Address Assignment and Translation Inference" (now expired), U.S. patent application Ser. No. 09/294,837 filed Apr. 19, 1999 entitled "Replica Routing" (now issued as U.S. Pat. No. 6,505,254 and entitled "Methods and Apparatus for Routing Requests in a Network"), and U.S. patent application Ser. No. 08/779,770 filed Jan. 7, 1997 entitled "Replica Routing" (now issued as U.S. Pat. No. 6,052,718); the entire teachings of all are incorporated herein by reference. With regard to the network switch 1410, the appliance 1420 is still able to use the process described in FIGS. 1-13 for the reasons to follow.

First, the process described in the main routine 200 and all subroutines 210-260, are general. The appliance 1420 can see ARP requests in the face of the switch 1410 but not ARP replies. However, the process of the main processor routine 200 (FIG. 2) and (sub)routines included therein 210-260, do not rely on ARP replies because of the possibility of proxy ARPs (i.e., misleading ether, ip_address information). This reduces the number of MAC/ETHER and IP addresses stored in the undetermined lists 410, 420 (FIG. 4), but not the determined lists 430, 440 (FIG. 4).

Furthermore, the appliance 1420, operating the process described herein, actively generates the information through eliciting responses from other devices, including the computers 120, router 130, and appliances 110, 1425. In the embodiment of the present invention described hereinabove, nothing is added into the process directly for the network switch 1410, making the present invention generic and general. Note that the present invention continues to operate on the physical and IP layers of the ISO standard for network communications, even in the more complex network 1400. Thus, the information included in ARP requests is all that is necessary for the appliance 1420 to learn of the subnet 180 topology in order to communicate with the central appliance server 150 and to receive a permanent configuration from database 155 stored in the central appliance server 150.

Also, the appliance 110 is able to complete its automatic network address assignment even though, at the same time, each other appliance 1420, 1425 in the subnet 180 is actively attempting to determine unassigned addresses for temporary usage. The reason parallel searching is possible by the appliances 110, 1420, 1425 is due to the numerous and repeated tests which verify that a potentially determined, unused IP address is, in fact, available, particularly at the very end of the process, which is during the final_conflict_check routine 260 (FIG. 13).

It should be understood that the methods taught by the principles of the present invention can be implemented in an appliance by a processor that executes computer instructions that are stored on a computer readable medium, such as a ROM, CD-ROM, magnetic disk, or other form of computer storage device.

Many appliances may be distributed across the WAN 140, forming an appliance network. The appliance network incorporates other unique forms of functionality that may be implemented to work in combination with the teachings of the present invention. The other forms of functionality are described in related applications, including: co-pending application Ser. No. 09/294,837, filed Apr. 19, 1999 entitled "Replica Routing" (now issued as U.S. Pat. No. 6,505,254 and entitled "Methods and Apparatus for Routing Requests in a Network"); co-pending application Ser. No. 08/779,770 filed Jan. 7, 1997 entitled "Replica Routing" (now issued as U.S. Pat. No. 6,052,718); co-pending Provisional Application No. 60/178,063 filed Jan. 24, 2000 entitled "Method and Apparatus for Determining a Network Topology in the Presence of Network Address Translation" (now expired); co-pending Provisional Application No. 60/177,415 filed Jan. 21, 2000 entitled "Method and Apparatus for Minimalist Approach to Implementing Server Selection" (now expired); and co-pending Provisional Application No. 60/177,985 filed Jan. 25, 2000 entitled "Fast-Changing Network Status and Load Monitoring and Feedback" (now expired). The contents of the above applications are incorporated herein by reference in their entirety.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method executing on a hardware network node for automatically determining a subnet mask, the hardware network node attached to a subnet in a packet communication network, the method comprising the steps of:
   during one search iteration for a possible subnet mask, issuing plural communication packets to at least one address known to be used in the subnet to evoke responses, each issued communication packet having a different one of possible plural source addresses; and
   based on presence or absence of responses to the plural communication packets, determining whether the possible subnet mask is the subnet mask that represents the subnet.

2. The method according to claim 1 further including the step of identifying plural source addresses just inside and outside a possible subnet mask.

3. The method according to claim 2 further including the step of forwarding a message to a known address on the subnet, from the plural source addresses.

4. The method according to claim 3 wherein the message is an ICMP request.

5. The method according to claim 3 wherein the step of determining is based on whether a response is received from the known address.

6. The method according to claim 2 wherein the plural source addresses are randomly selected.

7. The method according to claim 2 wherein the step of determining includes determining whether a node having a same address as one of the plural source addresses has been observed issuing other subnet communications.

8. The method according to claim 1 wherein the steps of issuing and determining are repeated until a response is received from just within a possible subnet mask and not from just outside the possible subnet mask.

9. The method according to claim 1 wherein the steps of issuing and determining are repeated until exhausting possible subnet masks.

10. The method according to claim 9 wherein an appropriate search method is applied to exhaust possible subnet masks.

11. The method according to claim 10 wherein the search method is a binary search.

12. A network node attached to a subnet capable of automatically determining a subnet mask in a packet communication network, comprising:
    an interface coupled to a subnet including at least one other network node; and
    a processor operating a processor routine, the processor being coupled to the interface to:
    during one search iteration for a possible subnet mask, issuing plural communication packets to at least one address known to be used in the subnet to evoke responses, each issued communication packet having a different one of possible plural source addresses; and
    based on presence or absence of responses to the plural communication packets, determining whether the possible subnet mask is the subnet mask that represents the subnet.

13. The network node according to claim 12 wherein the processor further identifies plural source addresses just inside and outside a possible subnet mask.

14. The network node according to claim 13 wherein the processor further forwards a message to a known address on the subnet, from the source addresses.

15. The network node according to claim 12 wherein the processor repeats the issuing and determining steps until a response is received from just within a possible subnet mask and not from just outside the possible subnet mask.

16. The network node according to claim 15 wherein repeating the issuing and determining steps is performed in a binary search manner.

17. An apparatus in a network node coupled to a network having one or more network nodes, the apparatus comprising:
    a storage means that stores a processor routine for determining a network configuration; and
    a processor loading the processor routine;
    the processor being commanded by the processor routine to:
    during one search iteration for a possible subnet mask, issue plural communication packets to at least one address known to be used in the subnet to evoke responses, each issued communication packet having a different one of possible plural source addresses; and
    based on presence or absence of responses to the plural communication packets, determine whether the possible subnet mask is the subnet mask that represents the subnet.

18. The apparatus according to claim 17, wherein the processor routine repeats the issuing and determining subnet masks until a response is received from just within a possible subnet mask and not from just outside the possible subnet mask.

19. The apparatus according to claim 18 wherein repeating the issuing and determining steps is performed in a binary search manner.

20. The apparatus according to claim 17 wherein the processor routine further identifies a source address at an edge of possible subnet masks.

21. The apparatus according to claim 20, wherein the processor routine further forwards a message to a known address on the subnet, from the source address.

22. A hardware processing device attached to a subnet in a packet communication network for determining a subnet mask, the processing device comprising:
- means for providing possible subnet masks;
- means for, during one search iteration for a possible subnet mask, issuing plural communication packets to at least one address known to be used in the subnet to evoke responses, each issued communication packet having a different one of possible plural source addresses;
- means for collecting responses to the plural communication packets issued to the at least one address; and
- means for determining whether the possible subnet mask is the subnet mask that represents the subnet, based on the collected responses.

23. The processing device of claim 22 wherein the means for issuing, collecting, and determining continues until a response is received from just within a possible subnet mask and not from just outside the possible subnet mask.

* * * * *